(12) United States Patent
Arenas

(10) Patent No.: US 11,720,946 B1
(45) Date of Patent: *Aug. 8, 2023

(54) METHOD OF CUSTOMIZING A PRODUCT WITH A DIGITALLY PRINTED ATTACHING MEMBER

(71) Applicant: George Gabriel Arenas, Sharpsville, PA (US)

(72) Inventor: George Gabriel Arenas, Sharpsville, PA (US)

(73) Assignee: George Gabriel Arenas, Sharpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,824

(22) Filed: Oct. 1, 2021

Related U.S. Application Data

(63) Continuation of application No. 17/016,392, filed on Sep. 10, 2020, now Pat. No. 11,157,979, which is a continuation-in-part of application No. 14/832,775, filed on Aug. 21, 2015, now Pat. No. 10,410,268, which is a continuation of application No. 13/184,476, filed on Jul. 15, 2011, now abandoned.

(60) Provisional application No. 61/364,859, filed on Jul. 16, 2010.

(51) Int. Cl.
   *G06Q 30/00* (2023.01)
   *G06Q 30/0601* (2023.01)

(52) U.S. Cl.
   CPC .................. *G06Q 30/0621* (2013.01)

(58) Field of Classification Search
   CPC .................................................. G06Q 30/0621
   See application file for complete search history.

(56) References Cited

U.S. PATENT DOCUMENTS

| | | | | |
|---|---|---|---|---|
| 4,776,043 A | * | 10/1988 | Coleman | A42B 1/248 2/244 |
| 5,820,225 A | * | 10/1998 | Ferriss | B60B 7/063 301/37.11 |
| 5,943,697 A | * | 8/1999 | Poskanzer | A41D 11/00 40/586 |
| 6,397,390 B1 | * | 6/2002 | Henderson | A41D 27/08 40/586 |
| 2001/0050031 A1 | * | 12/2001 | Bredt | B33Y 70/10 106/204.01 |

(Continued)

OTHER PUBLICATIONS

Shapeways.com: The destination for customizable gifts for everyone on your holiday shopping list. (Nov. 10, 2009). Business Wire Retrieved from https://search.proquest.com/docview/443780662?accountid=14753.*

*Primary Examiner* — Kathleen Palavecino
(74) *Attorney, Agent, or Firm* — McDermott Will & Emery LLP; Brennen P. Baylor

(57) ABSTRACT

A product or article of manufacture using a method of attaching a digitally printed attaching member to a material so that it can be customized with at least one add-on feature. The method uses 3D printing to produce attaching members with advanced features, providing unique customization capabilities. The method allows products to change their appearance or functionality and offers a new business model that uses the advantages of digital printing technology to enable advanced do it yourself customization of products. The method discloses how to integrate digital images with physical products.

24 Claims, 12 Drawing Sheets

(56) References Cited

U.S. PATENT DOCUMENTS

| | | | |
|---|---|---|---|
| 2005/0090928 A1* | 4/2005 | Gibson | D06P 5/003 700/133 |
| 2007/0094075 A1* | 4/2007 | Graham | G06Q 30/0211 705/14.72 |
| 2011/0047669 A1* | 3/2011 | Carr | A41D 27/08 2/244 |

* cited by examiner

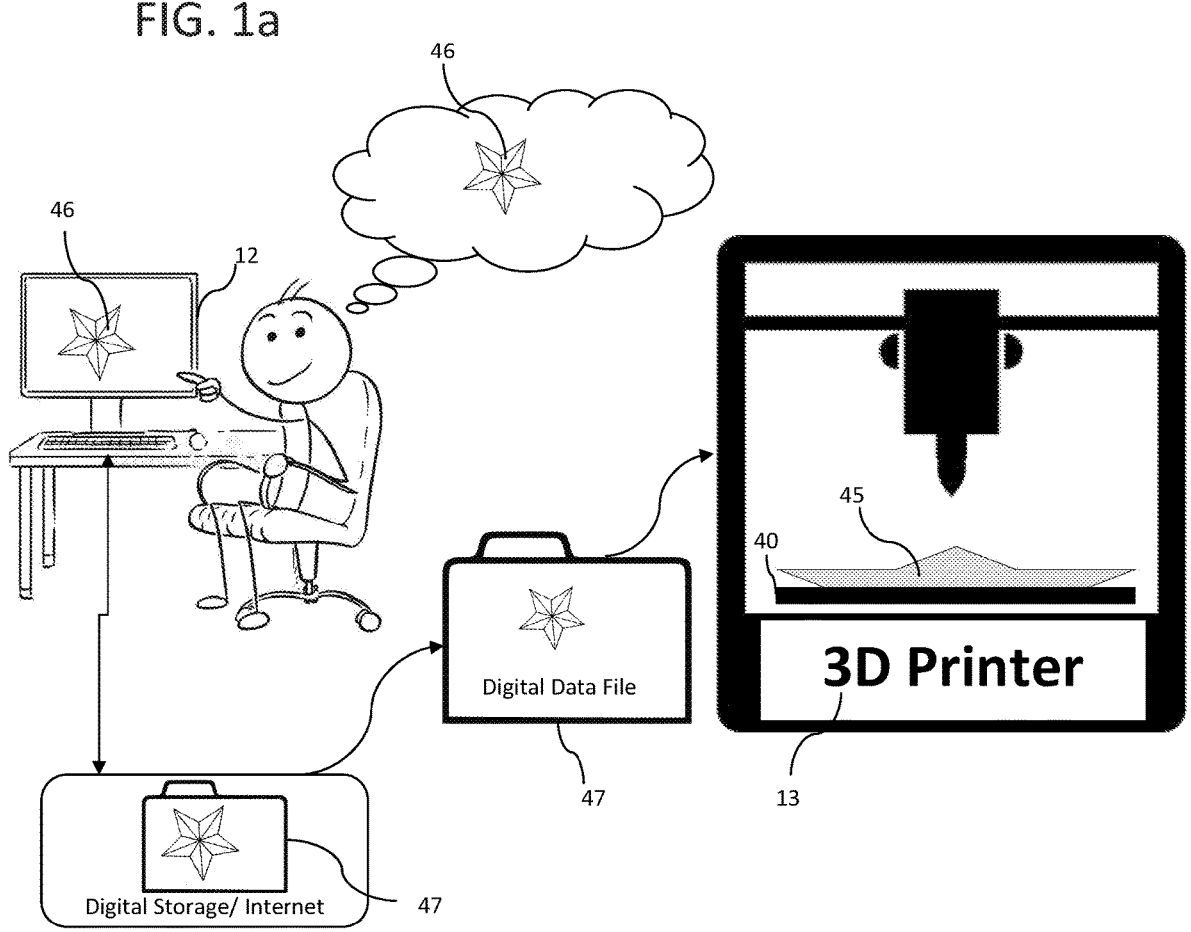

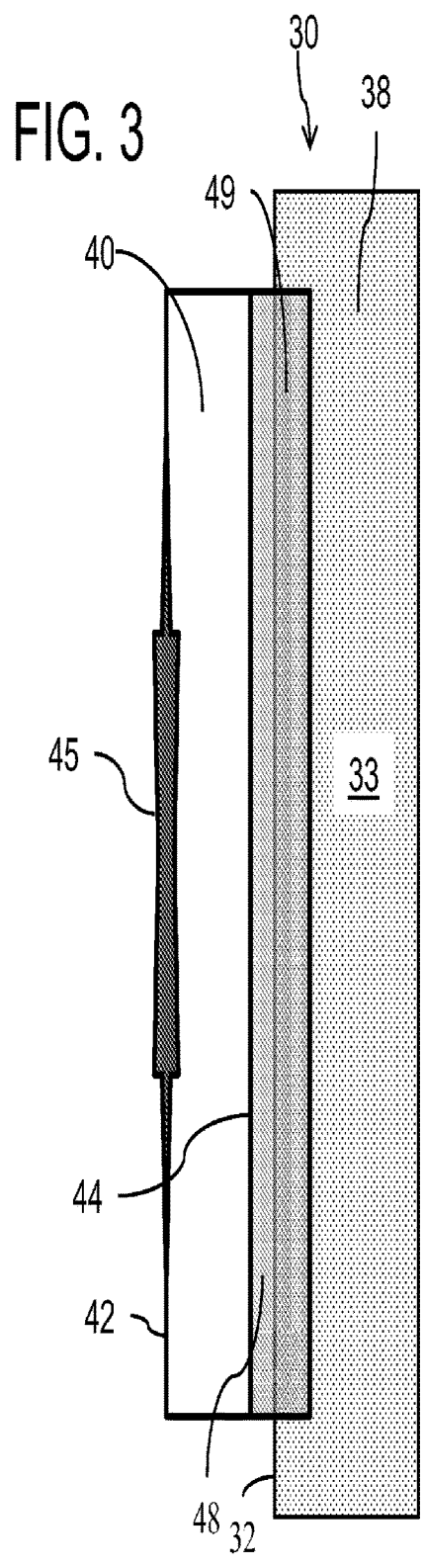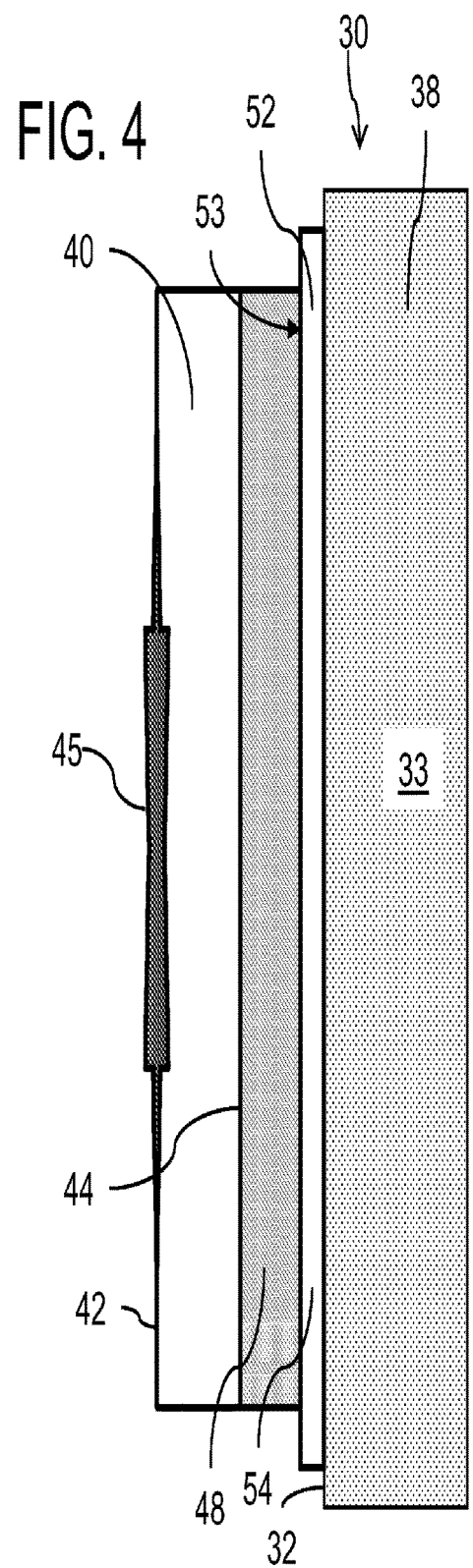

FIG. 5
FIG. 6
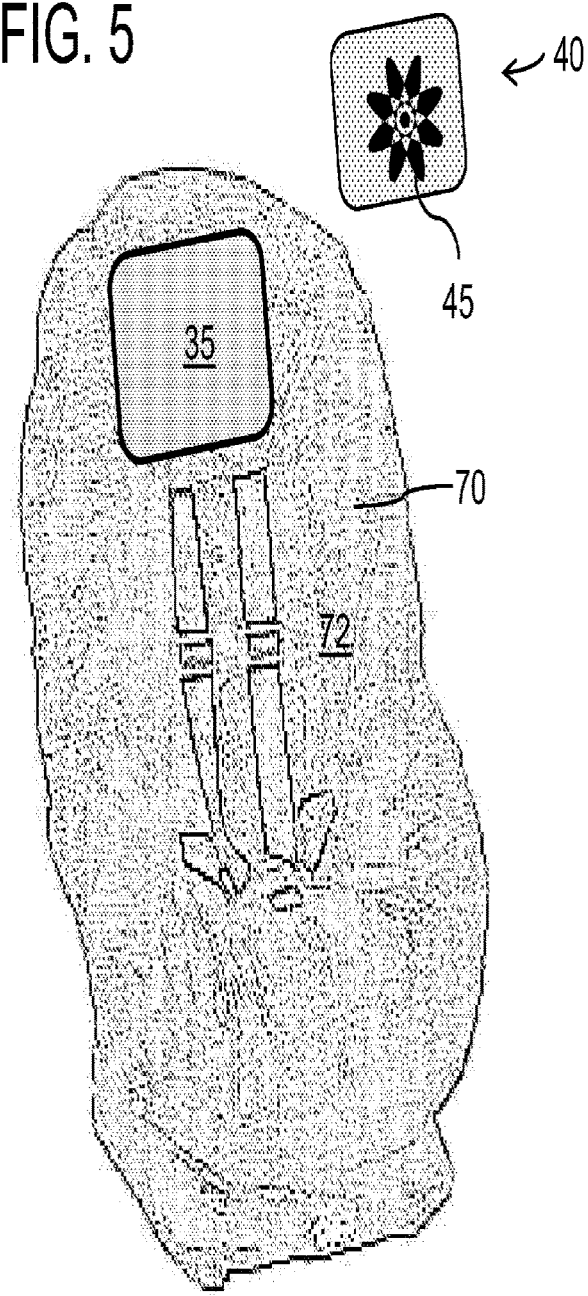
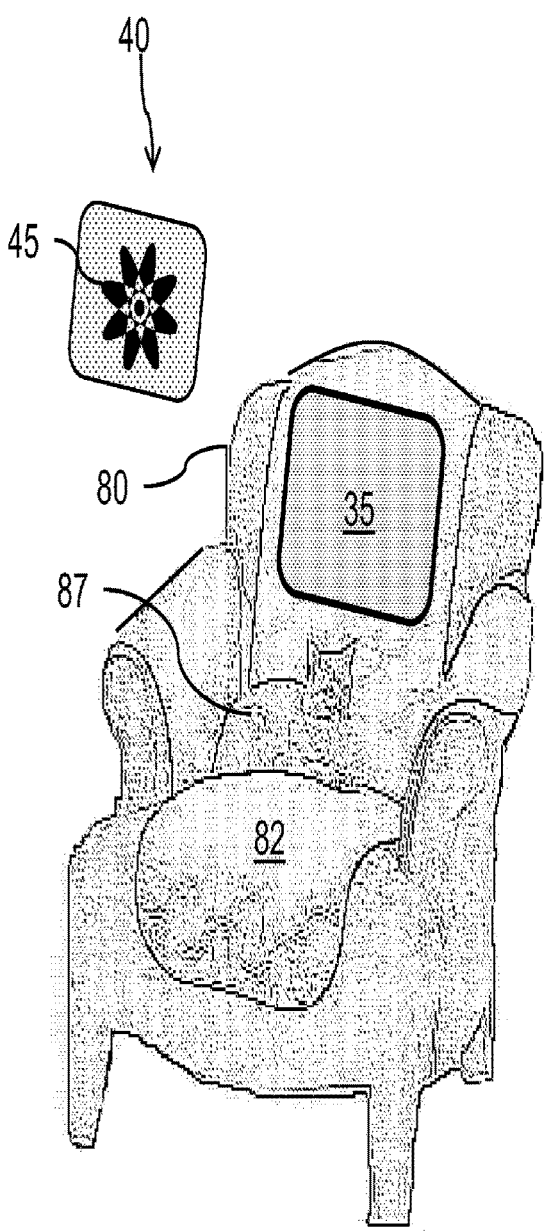

FIG. 8
FIG. 9
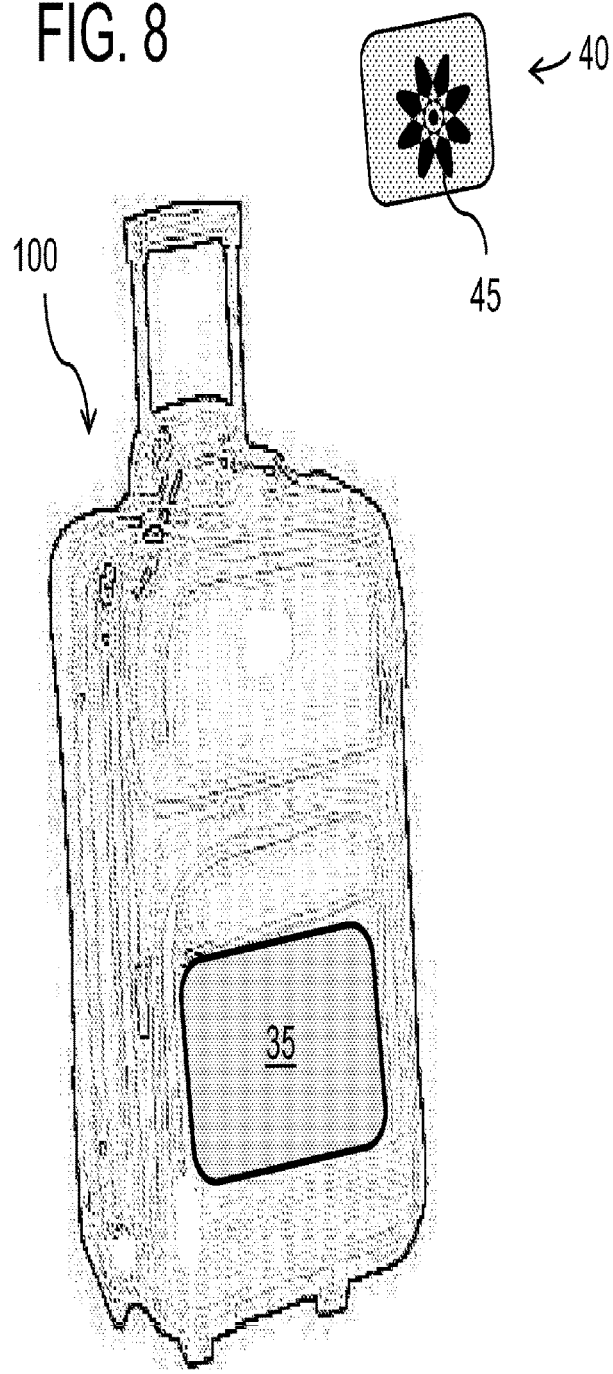
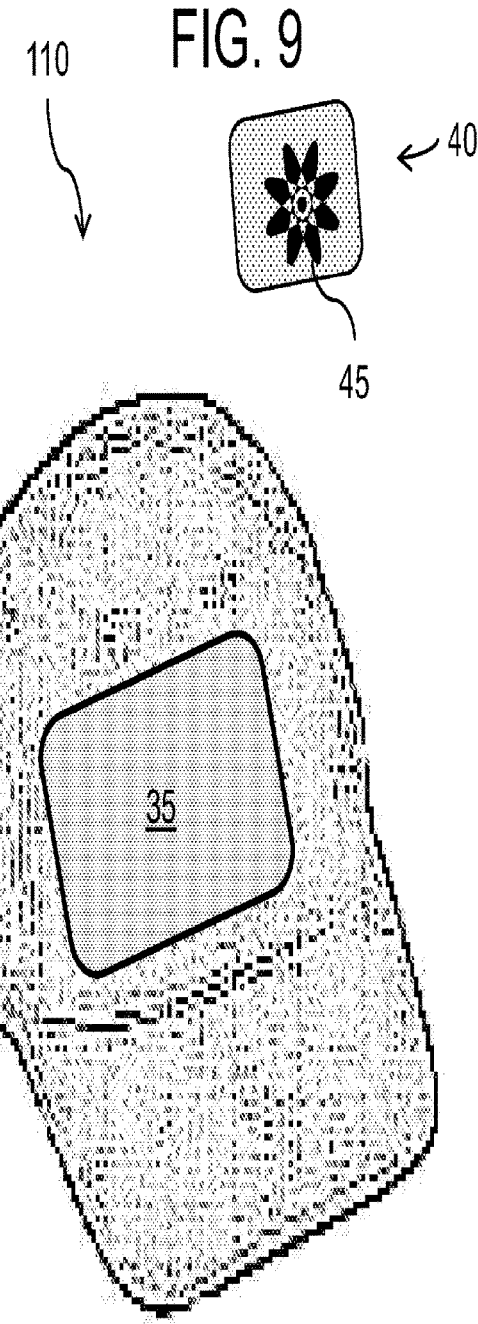

METHOD OF CUSTOMIZING A PRODUCT WITH A DIGITALLY PRINTED ATTACHING MEMBER

CROSS-REFERENCE TO RELATED APPLICATIONS

This application is a continuation of U.S. patent application Ser. No. 17/016,392 (now allowed) filed on Sep. 10, 2020, which is a continuation-in-part of U.S. patent application Ser. No. 14/832,775 filed on Aug. 21, 2015, now U.S. Pat. No. 10,410,268, which claims priority to U.S. Non Provisional application Ser. No. 13/184,476 filed on Jul. 15, 2011, which claims priority to U.S. Provisional Application No. 61/364,859, filed on Jul. 16, 2010, all of which are hereby incorporated herein by reference in their entireties.

BACKGROUND OF THE INVENTION

The present invention relates to a textile item or any product with the ability to modify its appearance by adding, removing or modifying an ornamental design, logo, or insignia and the like. The invention allows a textile or product to have a customized shape, size and functionality. The present invention further provides a way to use adhesive as a means of removably adhering an object onto a porous material, such as a textile, that is subject to varying temperatures and pressures, without the threat of migration of the adhesive into the pores or fibers of the textile. The invention further discloses a new business model that introduces digital technology to the traditional brick and mortar retail business model to gain business efficiencies and improved consumer satisfaction.

The origin of the present invention came about when the inventor approached the largest adhesive companies in the world, including 3M, Tesa, Henkel and numerous others, requesting a pressure sensitive adhesive that would allow a piece of fabric to be removably attached to a fabric based car seat. In all instances, the leading manufacturers of adhesives explained that it is impossible to find an adhesive that would work in the aforementioned application because over time, under the wide range of pressure and temperatures, all currently available adhesives would tend to migrate into the fibers of the fabric and there weren't any known adhesives that would work under such conditions without potentially damaging the vehicles seat. This led the inventor to identify the present invention which solves this problem and delivers a new broader solution to those seeking to removably attach any object onto a textile using adhesive. The inventor discovered that finding an innovative adhesive was not the best solution for the current problem. Instead, the inventor searched for a solution that worked around the shortcomings of adhesive technology to overcome the obstacle at hand.

Textiles are often used in numerous applications and products with two primary purposes, function and design. Whether a textile is used in an article of clothing, protective cover, home furnishing, carrying case, bedding, signage, rug or any of the many other applications using textiles, there is often an aesthetic component to the item that delivers a significant value to the overall textile article. In fact, some textile products are used more for their aesthetic characteristics than their function. As a small example, T shirts can be purchased plain or with a decorative ornament that helps add to the aesthetic value of the shirt. The fact that a majority of T shirts are sold with a decorative design permanently affixed to the item demonstrates the significant value that consumers place on the aesthetic aspect of most textiles.

The aesthetic appeal of a textile can be improved simply by adding color to the textile or adding a wide range of simple or complex designs. Ornamental designs are generally added to a textile at the point of manufacture in a number of ways including embossing, dyeing, sewing, sublimation, screen printing, embroidery and other means. These methods are not intended to allow a design to be removed. Instead, the designs become permanent fixtures of the textile. Current art does not generally consider the advantages of providing the consumer with the ability to customize the look of their textile product at any given time during the useful life of the item. Thus current art does not make it easy, practical or convenient to remove, add or replace ornamental designs on textiles.

In many cases, the owner of a textile item will appreciate the opportunity to use a textile's design to express themselves with a particular image, photo, emblem, 3D design or licensed logo that the consumer can relate to as a part of their personality. One of the shortcomings of most textile items is the limited number of designs available at retail points of sale. Most textiles are purchased from retailers with limited shelf space or inventory. In the case, of brick and mortar retailers, there is a finite amount of shelf space that can be allocated to varying available designs. For on line retailers, the limitations of designs is more a function of managing inventory and the ability of only being able to allocate time, attention and marketing dollars to a finite set of designs. These limitations force the consumer to decide between accepting a design that is available from the retailer, which can often be very limiting, or simply choosing not to purchase a textile product with a design on it because none is found that matches their personality or taste.

Also, there has been a tendency for many of the available designs to use licensed logos and designs that add an extra layer of cost that gets passed on to the consumer, further limiting the availability of reasonably priced designs that match the tastes of the consumer. Given the state of the current art, there hasn't been a practical way to offer consumers a generic textile product that allows them to affix their own design. Such an approach would serve both the consumer and the retailer by allowing fewer items to satisfy the varying aesthetic tastes of many without the need of larger quantities of inventory or valuable shelf space.

Retailers and manufacturers do not purposely seek to limit the availability of designs. Instead, retailers and manufacturers find themselves confined by the availability of shelf space and inventory to meet the wide range of designs sought after by the textile consumer. For retailers and manufacturers it is a constant challenge to identify the optimal balance of inventory to maintain for the numerous available designs. Limited brick and mortar retail shelf space requires retailers to be very selective in identifying the designs that will sell best at any given time. Since it is virtually impossible to accurately predict the design preferences of the consumer, retailers and manufacturers are constantly managing varying degrees of overstocking and under stocking the assorted designs that are being marketed. To complicate matters, design popularity changes constantly according to popular trends. The current invention helps to stabilize inventory levels by using a substantially reduced number of inventoried items required to satisfy the wide breadth of design tastes from the masses.

Customization is another sought after feature that has not been made widely available to the textile consumer at a brick and mortar store in the current art and is considered to be more of a custom service as opposed to an option intended for the masses. In addition to the desire to decorate a textile product, many textile product owners would appreciate the opportunity to personalize a decorative insignia that can be applied to a textile article. Instead of a generic insignia offered by a retailer, many consumers of textile products would prefer the ability to create and apply insignia that delivers their own message on their product. The current invention allows a consumer access to virtually an unlimited number of design options available to be applied to a textile in a design area that allows for the attachment and removal of new and exciting designs that are only limited by the imagination of the consumer. Advancements in digital technology, combined with the availability of the internet into most households, provides a new world of creative content that can serve a consumer to pick and choose a design that meets their aesthetic tastes. Furthermore, digital designs and add on features can be can be increasingly valuable due to advancements in 3D printing sometimes referred to as additive manufacturing. These technologies allow customization of size, shape, weight, strength and functionality of digitally printed objects.

As an illustrative example, we refer to vehicle seat covers, T shirts and hats that are well known as being textile products sold with numerous available designs at brick and mortar retail points of sale. Despite the vast range of available designs, retailers and consumers are restricted by the available shelf space that is only able to offer a limited number of designs at any given time. Since current seat covers, t-shirts, hats and other decorated textile products generally restrict their manufacturing to making permanently affixed insignia available to the mass consumer, there is little opportunity for these prospective textile product owners to personalize their own design, which is considered limiting in the current art. Although there are companies that offer varying levels of personalization, including monogramming, these services are generally not a do it yourself project and can be costly. Furthermore, monogramming and other forms of customization are not widely available and often have a shipping cost added to the total cost. The present invention offers the power of the internet and computer technology to deliver the opportunity for a more personalized textile product design at a moderate cost to the consumer, available from their personal computer, as well as other sources.

Until recently, prior art has been limited in the ability of creating decorative ornaments for textiles as a do it yourself project. Advances in technology are moving us closer towards this end. The wider availability of color printers in the home and workplace are making it possible to print vibrant colored designs from a common desktop computer and printer. Progress in commonly available software programs is allowing the novice computer user to be able to create unique and appealing designs easily from a person's personal computer. Adding to the progress in the field is the ability to use the power of the internet to deliver creative art directly to a person's home at minimal cost through a download. The internet also helps individuals to create their own personalized designs which can have 3D design features that adds expanded benefits to products. In addition, print media and inks that are better suited for textile decoration have improved and become more widely available. Finally, technological advancements in adhesives have opened the door to allow decorative designs to be affixed in areas where wide temperature and pressure ranges may exist during textile use. The current invention seeks to add to the progression of technology by providing a practical means to capitalize on the aforementioned advancements to allow an ornamental design to be added to a textile material without threatening the material with adhesive migration. Thus, the present invention makes personalization closer to being a do it yourself project with a more robust opportunity for customization of a design destined to be applied onto a textile.

Current art does not provide a practical way for a consumer to be able to add a design to a generically decorated textile item that may not have a design at the time of purchase. For example, a person who purchases a plain T shirt because they could not find a design of their liking, is not able to easily add a design as a do it yourself project. Also, it is not possible to modify, remove or change an ornamental design on a textile item without spending significant time and money, plus risking damage to the item in the process. Adding a design using the present art would require significant time in designing a new insignia and use of sophisticated sewing or printing techniques to apply the design so it looks good on most textile products. An important hindrance to the ease of installation of a new ornamental design is the omission of a designated space on a textile product that can universally hold a removable new design or insignia. Thus the consumer is faced with accepting the designs currently available in the marketplace at any given time and is unable to modify the look of a purchased textile product unless the entire item is replaced, which can be expensive.

Although a textile item may have a longer term life span, the tastes and preferences of a textile item owner may change well before the useful life of the textile item has ended. In this case, if a textile item owner wishes to have a different ornamental design used on their textile product, they must incur the expense of replacing the entire product in order to change its look, even though it may be in perfect working condition. This is considered wasteful and not practical. A better solution provided by the current invention is to provide a means that allows for the easy, quick and convenient changing of an ornamental design on a textile item, without the need of replacing the entire product, thus saving the consumer considerable money. Furthermore, some textile products, such as a seat cover, can be time consuming to install, making it inconvenient to go through the process of re-installation. Thus the current invention can save considerable amounts of time to those wanting to change an ornamental design on a textile numerous times during the products useful life. Also, many textiles are used in expensive products such as furniture, where it may be considered too costly to replace the item just to change the aesthetic look of the product. In this case, the furniture owner would likely keep their furniture, despite their desire for a different look, as a matter of economic practicality.

Current art has provided a number of mechanical means of attaching a removable object on a textile, including hook and loop tape, snaps, buckles, zippers and the like. For many textile applications, these mechanical means may not be practical or desirable because they add bulk, weight and cost to the product. Also, many textile products, such as clothing, seat covers, bedding and others come in contact with a body and its weight applied to the textile. In such a case, a mechanical fastener would likely be considered awkward and painful since it would press against the body when body weight was placed against it.

An alternative to using mechanical fasteners to attach an ornamental design to a textile is adhesive, which eliminates the bulkiness of mechanical fasteners and can be more economical from a production standpoint or as a fastening means itself. Short term usage of pressure sensitive adhesives in controlled temperature and pressure environments has allowed removable signage to be added to a textile surface in the current art. As an example, decals that allow a person to communicate their name are often used as disposable name badges affixed to a person's shirt or article of clothing at events. This type of removable decal is only appropriate for short term usage in a controlled environment and is severely limited in the scope of its use because of the threat of adhesive migrating into the clothing or textile surface of the object it is applied to.

Adhesives have long been used as an effective means of applying an object, such as an ornamental design, onto a non-porous surface where the threat of adhesive migration can be minimized or eliminated. Advances in adhesive technology have introduced dynamic adhesives that allow removable decals to be added to non-porous surfaces facing more challenging environments than ever before, including wider temperature ranges. This has allowed decals to be applied as wall hangings on interior and exterior walls and on vehicles, despite the challenging environments these applications can present, including wide temperature ranges. However, current art has come short of finding a solution that will allow the use of adhesive to removably attach an object onto a porous material such as a textile or others.

The challenge faced by the current art is in finding a way to adhesively attach a removable object, such as a decorative ornament, to a textile item for long term use under varying ranges of temperature and pressure. To varying degrees, adhesives flow depending on the temperature and pressure applied to them and their specific properties. Over time, an adhesive will tend to migrate into the fibers of a textile or porous material, entangling itself into the material. This entanglement reduces the removability of an adhesive from a textile over time as a bond begins to form as a result of the entanglement. This bonding effect can be minor or severe and can cause a multitude of problems, including adhesive detaching itself from the object or a permanent bond developing between the object and textile over time. This has eliminated the ability to effectively use adhesive as a means of adding a removably attachable object onto a textile or other porous material for long term use.

Many textile items are used in wide ranges of temperatures with varying degrees of pressure applied, making the use of adhesives inappropriate for affixing an object, such as an ornamental design or otherwise, to a textile item given the current art. Rugs, bedding, covers, bags, suitcases and seats are just a few examples of textile items known to face pressure and temperature ranges that make use of an adhesive not practical for attachment of an object due to the threat of adhesive migration given the current art. The present invention solves the shortcoming in the current art by providing a designated area to a textile where a non-porous patch is applied to serve as a barrier against adhesive migration between an object and a textile so that the object may be removed and re applied numerous times without causing damage to the textile or object.

SUMMARY OF THE INVENTION

The present invention solves the aforementioned problems in the market by providing a textile or product owner the ability to add, remove or modify any design of their choosing to a product. The present invention further provides a means of using adhesive to removably adhere an object onto a porous surface that is subject to varying temperatures and pressures by eliminating the threat of migration of the adhesive into the pores or fibers of the attached textile. The invention further introduces a new business model that provides significant efficiencies to the traditional brick and mortar retail models by introducing digital technology to add breadth of products at the retail shelf.

A textile item or product with a designated area on the visible surface, allocated to maintain a means of attachment for receiving an object maintaining an ornamental design or any other design, including 3D design. The size of the area of attachment can vary to accommodate the size and shape of the item. However, it should allow sufficient area so that the design or insignia can be fully attached and visibly seen to the satisfaction of the product owner.

A principal objective of the present invention is to allow a textile or product owner the opportunity to change the look of their product easily and economically without the need of replacing the item prior to the end of its useful life. The present invention provides an area on a product that is able to hold a design in proper position using an adhesive as an attachment means. The design may be ornamental or offer other features such as customized shape, size, functionality, strength and other printable features enabled by digital printing including 3D printing. The present invention recognizes that the area can be used to hold a wide range of other items that may benefit from using adhesive as an attachment means. The area is to maintain a non-porous surface to act as a barrier against adhesive migration into the fibers of the textile. A non-porous surface can be attached to the area by numerous means familiar to those knowledgeable in the art, including sewing, adhesively attaching, brushing or spraying a non-porous layer onto the textile surface, and by other means. Alternatively, a non-porous material may substitute the material in the area where a design is expected to be installed and removed. With the non-porous barrier in place, the product is able to utilize a wide range of repositionable adhesives, including pressure sensitive adhesives, to allow a decorative ornament, or other printed object, to be installed and removed from the product numerous times to adjust to the changing aesthetic and functional feature preferences of the product owner.

Numerous adhesive formulations are available to provide the appropriate adhesion properties that meet the conditions under which a textile may be used. Since the current invention solves the problem of adhesive migration onto a textile or product, a pressure sensitive adhesive can be applied to an object to serve as a means of attachment to a porous material. The object can be an object that is printed upon or it can be the printed object itself such as when an object is produced through 3D printing. The adhesive may be applied to the attaching member by numerous means familiar to those knowledgeable in the art, including lamination, spray, brush, coating and other means. The adhesive will provide the appropriate holding strength to maintain an attaching member properly positioned on a item. Concurrently, the adhesive will be formulated to address any additional stresses that may be applied to the product during use, including temperature, pressure, lateral friction and any other relevant variables that may have an impact on the holding strength of an adhesive.

There are many types of attaching members that may be considered for temporary attachment to a product. Although the present invention tends to focus on the advantages of attaching an ornamental design, those skilled in the art will recognize numerous other objects that may be temporarily held in place on a textile or product, or other porous material, using the present invention. The object can consist of any number of items that a person may want to removably attach to a product, such as a pocket, ornamental design or other object that would seek to be held in place on a textile, product or other porous material, for a temporary or long term period of time. The digitally printed attaching member can offer unlimited variations of customizable features including size, shape, weight, functionality and all other features that may be printed, in addition to ornamental features. When seeking to attach a digitally designed attaching member to a textile or product, the present invention recognizes that any material able to be processed through a printer, either a 2D or 3D printer, may be used. For a 2D printer it would be common for a flexible material to be used which can flow through the printer and have an ornamental design applied to it on its visible surface. For 3D printing, there is a significantly wider scope of materials available with varying flexibility, structural composition and form factors, allowing for a wide breadth of feature sets beyond just variable thickness.

Another objective of the current invention is to allow the safe removal of an attaching member from a textile or product without causing damage to the design element or the material that it is attached to. Prevention of adhesive migration protects the article from damage when an object is removed from the article. Without the teachings of the current invention, removal of an attaching member using adhesive as an attachment means would likely result in damage of the article due to entanglement of the adhesive into the fibers causing the fibers to be pulled or torn from the article during the removal of the attaching member.

The present invention also serves to avoid having adhesive detach itself from the attaching member during separation from the textile or product by avoiding entanglement with the item's fibers. Another objective of the current invention is to supplement the list of current fastening means available for attaching objects onto textiles or products that may be subject to wide temperature and pressure ranges, to include adhesives. As mentioned previously, the use of adhesives as a fastening means for textiles and other products made of porous materials has been very limited due to the threat of adhesive migration into the fibers of a porous material. This is particularly true during periods of extreme temperatures, pressures or other stresses that can be applied on an adhesive. The current invention overcomes this obstacle by introducing the use of a non-porous material as a barrier between an attaching member using an adhesive as a means of attachment and a porous material. For some applications, the current invention may serve to improve performance, decrease cost or both.

The use of adhesive as opposed to a mechanical fastener offers greater versatility to the attachment of objects onto a textile or product made of a porous material, particularly those exposed to wide ranges of temperature and pressure. Mechanical fasteners can be considered less practical for disposable objects that may be attached to a product due to the cost of the fastener itself combined with the cost of attachment of a mechanical fastener. The present invention offers the ability to use adhesive as a fastening means in disposable applications where cost efficiencies can be found over mechanical fastening means. Furthermore, adhesive may be a more appropriate choice in applications where bulk is sought to be minimized or where the bulkiness of a mechanical fastener is a detriment.

It is a further objective of the current invention to provide a textile or product owner the availability of a significantly broader range of designs than is currently available at brick and mortar retail locations facing limited space. The present invention recognizes that a removable ornamental design can be produced using a variety of means including printing, sewing, embroidery, and other means. The invention also recognizes that robust functional features can be designed into 3D printed attaching members. The invention also allows for the creation of personalized or customized designs by using a flexible material that is able to be printed on by many commonly available personal or professional printers with reduced cost to the textile owner versus other means of customization. In home customization of functional features are further enabled by the availability of 3D printed designs which can be produced in home based 3D printers or outsourced to specialized print shops also known as additive manufacturing facilities. The current invention recognizes the use of a flexible material that maintains an adhesive coating on its backside and a printable surface on its front side when using standard 2D printers. The adhesive is able to withstand the pressure and heat applied to it during the printing process. In many cases, the coated flexible material will also maintain a release liner on its backside to protect the adhesive during printing and prior to application onto the textile. For 3D printing applications material may be deposited onto a substrate that coated on its backside or adhesive may be applied onto a 3D printed object after printing.

With commonly available software, a product owner can design their own ornamental or functional digital design to be printed or they can download pre-fabricated designs from the Internet, diskettes or other secondary media. After printing a desired design, the textile owner would simply attach the customized design to the textile or product. Some product owners can opt to develop more creative designs that are personalized and include design components that are particular to their individual tastes. The versatility of this do it yourself design option allows virtually an unlimited number of designs available to the product owner from the comfort of their personal computing device.

The present invention allows a consumer the ability to create and print a design themselves that is removably attachable to a product in an allocated area. The printed object should be printed with high durability to withstand the rigors of use, including varying temperature and pressure ranges it will experience. Also, the present invention allows the product owner to select a design online and order the design pre-printed with the ability to be removably attachable to the product. This addresses the concern of the product owner that may not have a printer or is seeking to maximize the print quality for their design.

Another alternative offered in the present invention is for the product owner to download a created design that is stored as a digital file onto a transferable secondary media, such as a diskette, flash drive or other digital means of transfer, so that it can be delivered to a printer to be printed. The digital file maintaining the digital design can also be transferred via email or made available online via a website or cloud based online storage area.

It is a further objective of the current invention to provide a retailer or manufacturer greater control of inventory by requiring fewer items to be purchased to satisfy the design demand of the consumer. This expansion of designs without the need for increased inventory or item count provides significant efficiencies to the supply chain and requires less space to satisfy a wider design base. The current invention allows a retailer and manufacturer to produce one core set of products that offers a wide breadth of design options which can be applied to the core set of products without using up valuable shelf or warehouse space. Instead of allocating warehouse or retail space to numerous individual designs, the brick and mortar retailer and manufacturer can offer the consumer a product that has the availability of a wider breadth of designs and add on features delivered electronically via the internet or alternative digital media, without using up physical space.

The present invention brings the power of the internet and digital technology to the brick and mortar retailer and levels the competitive playing field. In the same way, the method serves retailers to allow advanced customization of products, the business model and method can be applied to companies, governments and organizations seeking to provide do it yourself customization to items that can benefit from a digitally printed add on feature in 2D or 3D. Previously, the internet provided online retailers a distinct competitive advantage in the ability to cost effectively offer substantially more choice to online customers over brick and mortar retailers because the virtual world does not face the physical limitations of shelf space or warehousing requirements. On the internet, it is easy to offer a wide breadth of product designs because products can be made upon order or drop shipped by manufacturers, making the cost of offering variety less restrictive. Since brick and mortar stores have a very finite and limited amount of physical shelf space and storage area that can be allocated to any product category, it generally must be very selective in the design options it offers to its customers. The present invention removes that barrier by allowing a consumer the ability to purchase one generic item at a brick and mortar retail shelf and apply a design from a virtually unlimited supply source available from the internet or other digital media. Removing the competitive advantage of breadth from on line retailers allow brick and mortar retailers to regain some lost customers that have migrated to the internet in search of choice.

It is a further objective of the present invention to apply this novel approach to customization to both porous and non porous materials where a digitally printed add on feature can add value. Those skilled in the art will recognize the benefit of the present invention to a wide range of products that are commonly exposed to wide ranges of temperatures and pressures that do not allow an object to be removably attached using adhesive in the current art. Among just a few of the textile products that may benefit from the present invention are textiles worn on the upper torso such as T Shirts, coats, jackets, jerseys, sweatshirts, robes; textile worn on lower torso such as pants, shorts, underwear, boxers, pajamas; bags such as sports bags, duffle bags, golf bags, diaper bags, garment bags; cases such as suit cases, computer cases, laptop cases, tablet cases, pet carriers, pool stick cases, gun cases; protective covers such as car covers, boat covers, horse covers, seat covers, grill covers, furniture covers, shopping cart covers, tarps, sun shades; umbrellas; hats, gloves; pet beds; outdoor gear such as sleeping bags; outdoor folding chairs, lounge chairs, tents; home furnishings such as drapes, window shades, placemats, rugs, floor mats, aprons, bibs, towels, tablecloths; bedding items such as sheets, blankets, pillows, pillow cases, comforters; air driven devices such as hot air balloons, kites, sails, parachutes; exterior signage; awnings; furniture such as recliners, sofas and beds. This is just a short list of textile items that are able to benefit from the current invention but this list is not intended to limit the scope of usage for the invention in any way as those familiar with the art will find numerous other textile applications where the current invention can be applied. Prior to the current invention it was not possible to attach a removable object onto a textile or product made of a porous material using adhesive due to the limitations caused by adhesive migration.

It is yet a further objective of the invention to teach the art a means of removably attaching any object to a textile item, or other porous material, using adhesive. Although the current invention is particularly well suited for the removable attachment of an ornamental design onto a textile, those familiar with the art will recognize a wide range of objects that will benefit from being able to be removably attached onto a textile using adhesive as opposed to other mechanical fastening means. For example, many applications that have previously used a hook and loop mated fastener system to address the obstacle of wide temperature ranges and pressures will find the current invention to be a welcomed option that may provide numerous benefits. Lighter weight, lower cost, and less bulk are just a few advantages that are made available in the current invention over other fastening means used to removably attach an object onto a textile, including hook and loop tape, mechanical fasteners and the like.

The digital customization benefits of the present invention also provide advantages to products that find mechanical fastening means to be advantageous over adhesive. The use of 3D printing technology allows mechanical fastening systems to be printed directly onto the attaching member to save on cost and add strength. By 3D printing an attaching member the attachment means can be integrated in the design of the attaching member so that it is printed and does not require adhesive or mechanical attachment methods to be added after printing. The use of 3D printing also allows for uniquely designed attachment means that deliver greater performance than traditional mass produced mechanical fasteners with a wider range of materials and fastening features.

One more important benefit provided by the present invention is the introduction of bespoke add-on features that are only enabled via 3D printing. While 3D printing does enable attachment members to be printed with interesting ornamental designs with variable thickness, the capabilities of 3D printing provide significant opportunities for unique features that go well beyond decoration and thickness variation. The 3D printed attaching members are able to provide customized shape, weight, strength, flexibility, size, cushion, texture and more. Mass produced products are often unable to produce the same breadth of features available to items that are made using additive manufacturing technology. With the current business model, a person can now add features available from 3D printed attaching members that were previously unavailable on a mass produced product. Also, additive manufacturing allows a wider breadth of materials and complex structures that are simply unable to be produced via mass production. With the current business model all of the complex structures, materials and unique product features enabled by 3D printing are able to be merged with a mass produced product through the creation of a 3D printed attachment member that is removably attachable to an attachment area on a product. Using the method provided by the present invention, mass produced products can have significantly more customized features made available via a 3D printed attachment member that is removably attachable to the product.

The present invention seeks to teach the current art a means of adhesively attaching a digitally printed object onto a porous surface subject to a wide range of temperature and pressure without the threat of adhesive migration. The invention also teaches how to facilitate do it yourself customization of products with advanced features provided by a digitally printed attaching member which can be produced in 2D or 3D.

BRIEF DESCRIPTION OF THE DRAWINGS

While the specification concludes with claims particularly pointing out and distinctly claiming the subject matter of the invention, it is believed the invention will be better understood for the following description, taken in conjunction with the accompanying drawings where in:

FIG. 1a is a flow diagram describing the method of producing an attaching member using digital printing technology.

FIG. 3 is a cross section view of a digitally printed object attached to porous material using an adhesive attachment means that has migrated into the fibers of the porous material;

FIG. 4 is a cross section view of a digitally printed object attached to a porous material using an adhesive attachment means with a non-porous material serving as a barrier against adhesive migration into the porous material;

FIG. 5 is a front view of a removable digitally printed design and a seat cover for an infant car seat with an attachment area for accepting the digitally printed design;

FIG. 6 is a front view of a removable digitally printed design and a seat protector for a recliner chair with an attachment area for accepting digitally printed design;

FIG. 8 is a front view of a suitcase with an attachment area for accepting a digitally printed design;

FIG. 9 is a front view of a baseball cap with an attachment area for accepting an digitally printed design.

OVERVIEW

Figure 1:
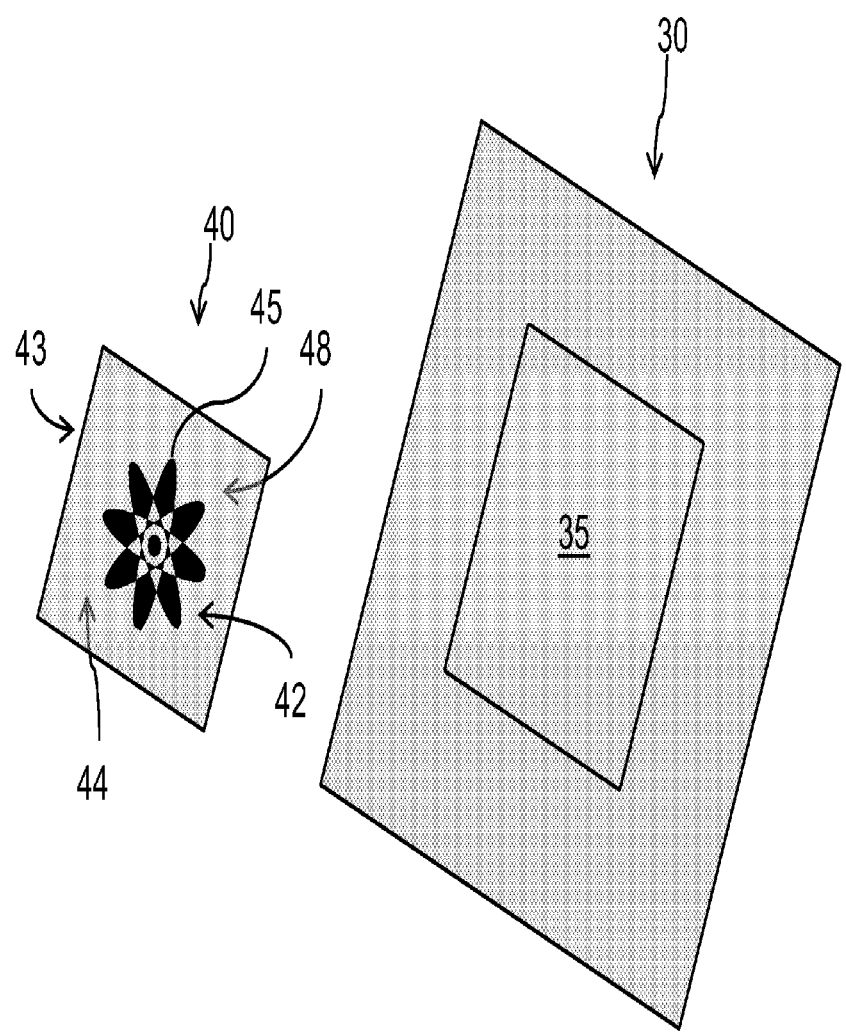
FIG. 1 is a front view of a digitally printed object that is able to be removably attached to a material.

In one exemplary embodiment of the present invention, an article is provided. An attaching member is also provided. The article and/or the attaching member includes a coupler (such as adhesive, a mechanical coupler, etc.) for attaching the attaching member to the article. A digital design is digitally printed to produce customized features in the attaching member, the digital design being obtained from a digital file. A customer may choose the article and/or the attaching member and payment may be received for the article and/or attaching member.

DETAILED DESCRIPTION OF THE PREFERRED EMBODIMENT

The present invention allows a product owner the ability to add, change or remove an attaching member onto an article of manufacture quickly, easily and without the need of replacing the product prior to the end of its useful life. The attaching member may serve to change the aesthetic appearance of the item by maintaining an ornamental design or it can provide varying functional and structural features that improves the products versatility. The invention further teaches how to use a non-porous patch on a porous material to avoid the danger of adhesive migration when using adhesive as a fastening means to attach a digitally printed object onto a porous material, such as a textile. The invention can also be applied to a new business model, allowing digital designs to be applied onto physical products, thereby bringing the power of the internet to traditional brick and mortar business models and introducing do it yourself customization using digital printing technology.

Referring now to the drawings wherein the showings are for the purpose of illustrating a preferred embodiment of the invention only and not for the purpose of limiting the same, FIG. 1a describes a method for producing an attaching member using printing technology. The attaching member may be customized digitally prior to printing. A virtual image 46 is conceived as an idea and converted into a digital design which is a digital representation of the virtual image 46. Alternatively, the virtual image may be found on the internet or digital storage and viewed or modified on a computing device 12. The conversion from idea to digital design is done via a computing device 12 which can be a laptop computer, desktop computer, tablet, smartphone or any other device capable of producing or altering digital designs. The design parameters are stored in a digital file 47 which can be held in a digital storage area that can be physical or virtual. These design parameters can be adjusted or modified to create bespoke designs. The digital design defines all printable characteristics of the attaching member including size, shape, physical structure and specialized features that may deliver advanced functionality. The digital design can be made available from a transferable flash drive or computer hard drive, as well as being stored on the internet using cloud storage or other means. There are a wide range of evolving file types that may be used in advanced digital printing technology and computer aided design (CAS) including STL files and others used for the creation of complex printable structures and features. The digital file 47 is accessible to a printer 13 so that it can be converted from a digital representation of the design 46 into a physical printed design 45 via the application of basic or complex digital printing technology, including any relevant CAD and printing software as well as printer interfaces. The digital printer 13 shown in FIG. 1a is a 3D printer but any digital printer, 2D or 3D, would be applicable. The printer 13 illustrated in FIG. 1a represents the vast assortment of printer types within the digital printing space and is not limited to the form factor or type shown in the illustration. The digital printer 13 represents any printer that converts a digital file into a printed output.

Throughout the description of drawings reference to printable media 40 is defined as any material that can be processed through a printer and have a digital design applied to it. Printable media can be a substrate that is printed upon or material formed through printing. In 3D printing applications, objects are formed into the shape, structure and functionality defined by the digital design being sent to the printer in a digital file 47. Most 3D printed designs are produced one layer at a time or other evolutionary means. A 3D printed object will have a length, width and height in its most simplest form and can increase significantly in complexity of design. Printable material in 3D printing is available in many varied forms including sheets, pellets, filament, liquid, powder and others. Furthermore, there are numerous 3D printing processes, methods and technologies used to produce a variety of 3D objects. All references to 3D printing should be considered synonymous with additive manufacturing. In 3D printing applications there is a wide and growing array of printable materials consisting of advanced materials, alloys and functional components that are combined via printing to produce printed objects 45 with advanced and complex feature sets. 3D printing applications may use individual materials or combinations of materials and components integrated together to form one printed unit or a series of printed output.

FIG. 1 shows an object made of a printable media 40 which is made to be removably attachable to a material 30 using an attachment means 48. The attachment means 48 resides on the backside of the object 40 to allow it to be affixed to an attachment area 35 residing on the material 30. The material 30 can be a porous or non porous material. When adhesive is used as the attachment means, the attachment area 35 is a non-porous material that serves to act as a barrier against adhesive migration between the object 40 and a porous material 30. Alternatively, those familiar in the art will recognize that adhesive 48 may reside on the attachment area 35 as opposed to the object 40. The object which is made of printable media 40 can be made of a wide range of materials, including fabric, plastic, leather, metal, wood, ceramic or any complex material available to be used in a digital printer, 2D or 3D. The material 30 that the object 40 will be attached to can be made of a wide range of materials with varying porosity, including all textiles and other known porous or non porous materials.

The preferred embodiment maintains a printed design 45 on the outward facing surface 42 of the object to allow customization of appearance. Other embodiments may have the printed 3D design 45 not exhibit any visible ornamental features on its surface but instead the printed design 45 may have unique internal features that offer advanced customization beyond merely an ornamental design. The printed design 45 can be applied to the object by numerous means of advanced printing technology, including 2D printing and 3D printing methods such as stereolithography, digital light processing, fused deposition modeling, selective laser sintering, selective laser melting, electronic beam melting, laminated object manufacturing, binder jetting technology, material jetting, continuous liquid interface production, selective heat sintering, direct metal laser sintering, laminated object manufacturing and any other additive manufacturing process that produces a 3D output having a length, width and height or thickness. The present invention utilizes the internet, digital storage, and available computer technology to provide a vast supply of varying designs that can be applied to produce the digitally printed design 45. The printed design can be ornamental, functional or both.

The backside 44 of the object 40 can maintain an adhesive 48 as a means of attachment for holding the printed design 45 onto the material 30. The preferred embodiment uses adhesive 48 applied to the entire back surface of the object 40 but some familiar in the art may find cost saving benefits applying adhesive 48 in a pattern formation to minimize the quantity of adhesive 48 used. Those familiar with the art will recognize that other means of attachment may be used instead of adhesive 48, including mechanical fasteners such as hook and loop fasteners, snaps, zippers, and the like. When using a matable fastening means the attachment area 35 would maintain a mated fastener that mates with a corresponding fastener found on the backside 44 of the object 40. Some mechanical fastening systems, such as zippers, snaps and the like, will tend to use the perimeter 43 of the object 40 as the primary point of attachment.

Figure 2:
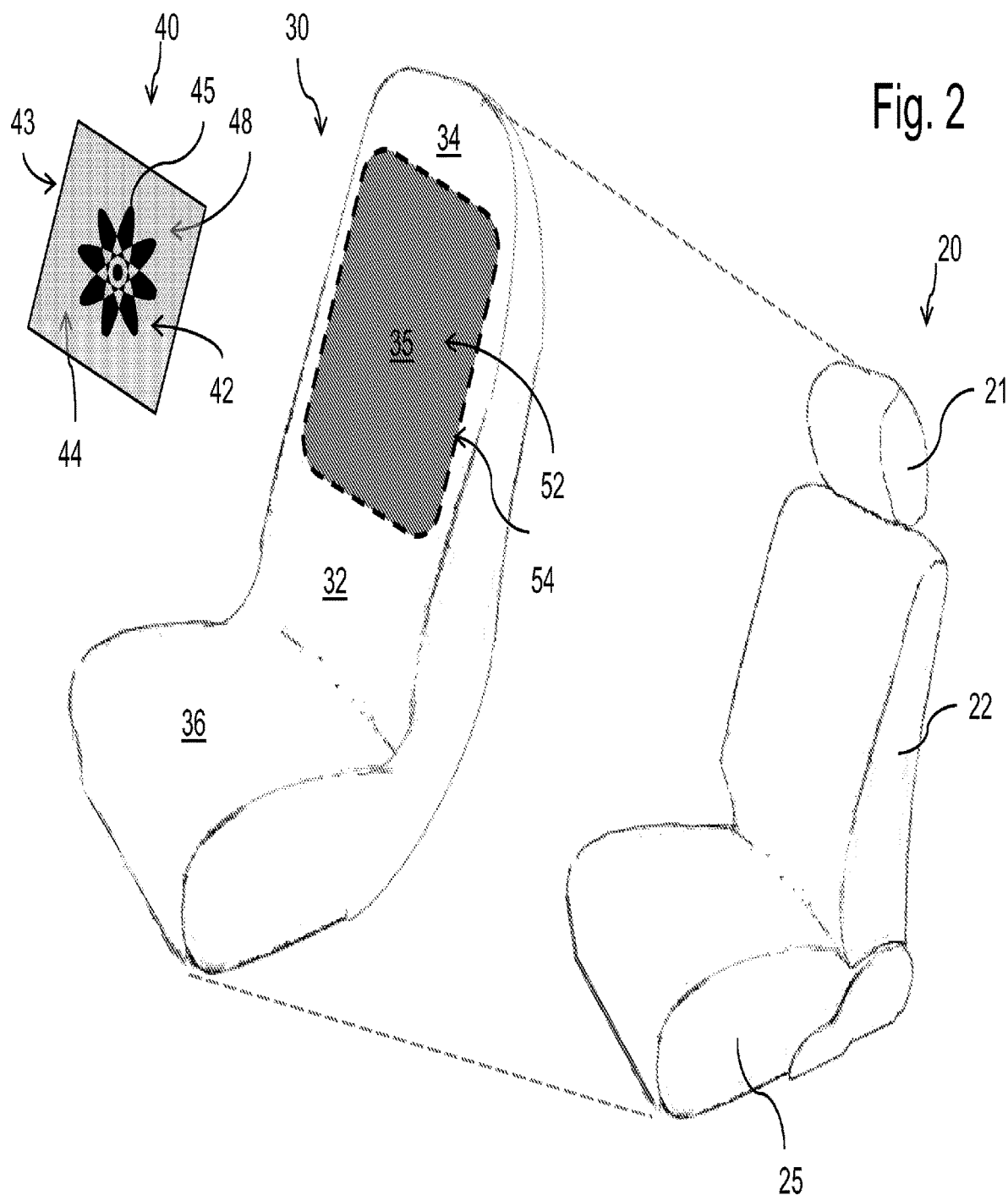
FIG. 2 is an angled view of a digitally printed object maintaining a design floating over a seat cover floating over a vehicle seat using an attachment means to removably attach the object to the cover.

FIG. 2 uses a seat cover as an example of an item made of a porous material that is commonly subject to wide ranges in temperatures and pressures. FIG. 2 shows the present invention used to removably attach a printed design 45 on a porous material 30, which is illustrated as a textile used in a seat cover. As will be shown in the collection of drawings, the present invention is an appropriate solution for all products or material that can benefit from the customization of a digitally printed add on feature. The present invention teaches a means of adhesive attachment that extends beyond seat covers and onto other porous materials, such as textiles and other materials, which may be subject to wide ranges of temperature and pressure during the items useful life. FIG. 2 shows a vehicle seat 20 having a seat back cushion 22 and seat bottom cushion 25 and a head rest 21. FIG. 2 illustrates a vehicle seat cover 30 with a front surface 32 facing away from the seat 20 that has a top portion 34 that covers the seat top 22 and a bottom portion 36 that covers the seat bottom 25.

FIG. 2 shows the preferred embodiment using adhesive 48 as a fastening means for removably attaching a digitally printed design 45 onto a seat cover 30. Advances in adhesive technology offer a wide range of appropriate adhesives for the present invention, including but not limited to pressure sensitive adhesives. The current embodiment uses an adhesive 48 that does not create a permanent bond but instead allows an object 40 to be held in place and removed or replaced when desired. The appropriate adhesive 48 will allow sufficient strength to hold the object 40 in place during use, resisting the lateral movement of a human body as it slides onto and off of the material 30 during use. The adhesive 48 will also be appropriate for the varying temperature ranges and environments that are common during the application in which the invention is applied.

In FIG. 2, the surface 32 of the material 30 is not suitable to using adhesive 48 as a means of attachment in the wide ranges of temperatures and environments where the porous material 30 may be exposed to due to the threat of adhesive migration. The preferred embodiment of the present invention overcomes this limitation by allocating a space 35 on the porous material 30 for a patch of material 52 to provide an appropriate attachment area 35 to receive a pressure sensitive adhesive 48 found on the backside 44 of the object 40 maintaining a digitally printed design feature 45. The preferred embodiment uses a non-porous material as the patch 52 to prevent migration of adhesive 48 from the object 40 onto the textile 30.

Those familiar with the art may recognize numerous types of materials that would serve the purpose of avoiding the migration of adhesive 48 from an object 40 onto a porous material 30. The material can be applied onto the porous material 30 by numerous means including but not limited to sewing, brushing, radio frequency welding and other means. In some cases, the barrier patch 52 can be fastened around its perimeter 54 to the porous material 30. Alternatively, the patch 52 may be applied in a liquid form that solidifies to create the non-porous surface needed to act as a barrier to adhesive migration into the porous material 30. In other instances, the patch 52 may replace the porous material 32 altogether in the allocated space 35 set aside to receive the object 40 maintaining the ornamental design 45.

The patch of material 52 covers at least the same amount of surface area on the porous material 30 as the total surface area of the object 40 in order to allow a full attachment surface with the adhesive 48. The patch 52 allows the pressure sensitive adhesive 48 to hold the removable object 40 in place on the porous material 30, while also avoiding a permanent bond between the adhesive 48 and the porous material 30 in order to allow the object 40 to be removed and re-installed on the porous material 30 numerous times without damaging the porous material 30 or object 40.

Pressure sensitive adhesives have undergone significant technological advancements and the present invention utilizes the proper pressure sensitive adhesive 48 appropriate to the environment where the porous material 30 will be used. The pressure sensitive adhesive 48 may cover the entire back surface 44 of the object 40 maintaining the printed design 45 or it is possible to use a variety of different patterns of adhesive patches on the back side 44 of the object 40 to provide the appropriate holding strength when the object 40 is adhered to the patch of material 52 on the porous material 30. The preferred embodiment recommends the use of a patch of matable material 52 appropriate to the pressure sensitive adhesive 48 being used in order to obtain the right balance of removability and holding strength for the application in which the invention will be used for.

FIG. 3 illustrates the tendency of a pressure sensitive adhesive 48 residing on the back surface 44 of an object 40 maintaining a digitally printed 3D design 45 to become entangled in the fibers 38 of a porous material 33 over an extended period of time with varying temperature and durations of pressure being applied to the porous material 30 and its surface 32. Over time, under varied circumstances, a significant percentage of the adhesive 48 can migrate and occupy an area 49 where the adhesive 48 becomes entangled into the porous material 30 to the point of establishing a permanent or semi-permanent bond with the textile 33, making it difficult to remove without causing damage to the porous material 30 or removable object 40 maintaining a digitally printed design 45. Prior to the current invention, adhesive migration made it impractical or risky to apply a removable object 40 onto a porous surface 32 for an extended period of time using adhesive 48 as a fastening means.

FIG. 4 illustrates how adding a patch of material 52 as a barrier 53 between an adhesive 48 residing on the back surface 44 of a removable object 40 and a porous material 30 serves to prevent adhesive migration and allows a digitally printed 3D design feature 45 to be efficiently installed and removed numerous times from the porous material 30 without becoming entangled in the fibers 38 of the porous material 33. Those familiar with the art will recognize that the patch of material 52 can be attached to the porous material's surface 32 by numerous means, including but not limited to sewing, radio frequency welding or other means. Alternatively, the patch of material 52 can be applied in a liquid or spray form that solidifies to become a non-porous material 54 that acts as a barrier 52 against adhesive migration. Alternatively, the present invention can replace the textile material 33 in the area where the patch of material 52 resides.

FIGS. 3 and 4 illustrate a digitally printed 3D design 45 with variable thickness. Since the printed design 45 has a length and a width as shown in FIG. 1 and shows a complex design 45 with variable thickness in FIGS. 3 and 4, this printed object is considered to be made by 3D printing or additive manufacturing. While the printed design 45 shown in FIGS. 3 and 4 with variable thickness is considered to be 3D printed, the object may offer many more customizable features beyond ornamental design, variable thickness and texture. The design 45 is shown in FIGS. 3 and 4 to have a complex geometry resembling a star. This star design is used to represent all of the complex designs available in 3D printing. The design 45 shown does not only extend above the surface of the object but also extends towards the back of the object. The design 45 is able to deliver varied shapes and features throughout its printed structure from the surface to the backside of the 3D printed object and all the printed material, components and design features in between. When 3D printed the design can be made with all of the complexities and benefits enabled by 3D printing including designs that create an internal structure with customizable strength, flexibility, dynamic materials, conductivity, weight and other 3D printed features. A 3D printed design can also have fastening means printed on its backside.

Figure 4A:
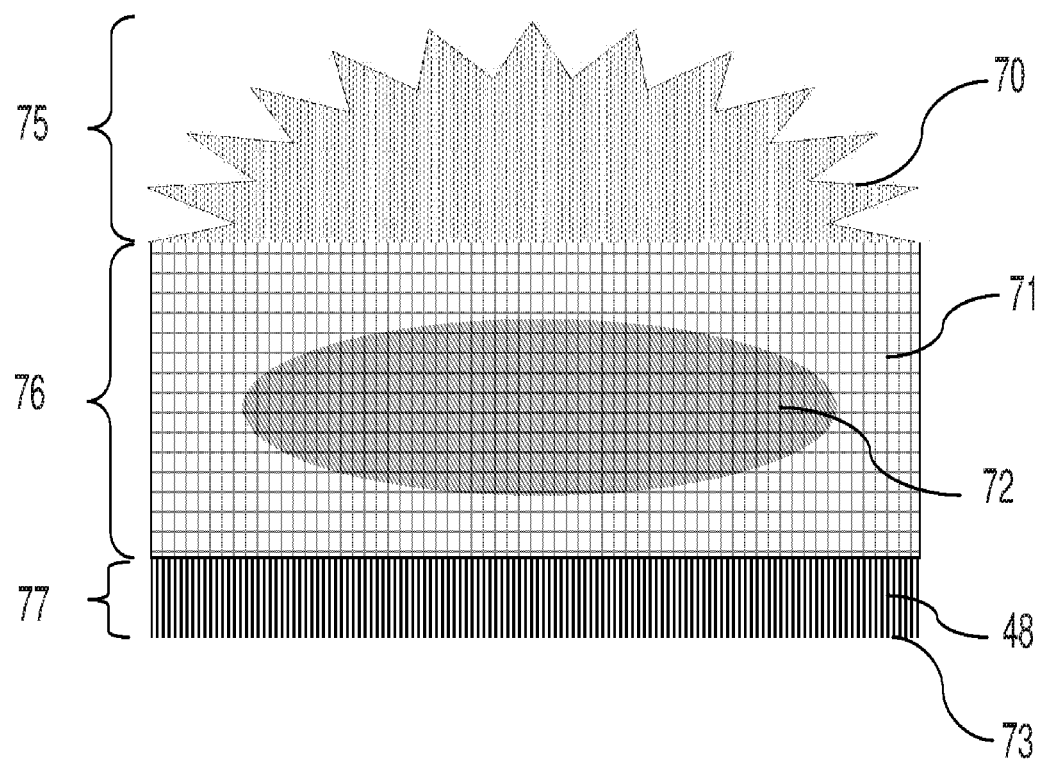
FIG. 4a is a cross section of a digitally printed object and attachment means

FIG. 4a illustrates an embodiment of a 3D printed object that serves as an attaching member to customize a product or manufactured item. The object can be designed to include any feature set enabled by 3D printing. The object's design is illustrated in three sections of an exemplary 3D printed design, showing the surface area 75, body 76 and back 77 for descriptive purposes that describes advanced functionality provided by a 3D printed attaching member. The top surface area 75 or outer visible surface 70 of the printed object can have any design enabled by 3D printing including abstract and complex textures and irregular shape with varied colors. The top surface area 75 provides customized aesthetic appearance and other features enabled by 3D printing. For example the surface can be deliver customizable texture, conductivity, cushion, elasticity, hardness, durability, abrasiveness, radiation properties, protective properties, reflective properties and any other surface feature that is able to be 3D printed. The wider breadth of complex materials and design features that can be incorporated into a 3D printed design allows customized attaching members to deliver advanced features to the surface area, beyond mere aesthetics.

The body's design area 76 extends from the bottom layer 73 to the top layer 70. This area can customize various properties of the object as a whole including its weight, strength, physical properties, structural performance, flexibility and any features enabled by 3D printing. In addition to varied internal structures 3D printing the object allows the body to be composed of multiple materials, which allows features unavailable in 2D printing or traditional manufacturing. FIG. 4a shows a hollow structure 72 which can serve to reduce weight as an example but other varied structures and materials can be incorporated and combined throughout the body 76 to create unique feature sets. Another important feature that may be incorporated into the printed design is storage of energy, data or any other feature that may be transferred or transmitted from the digitally printed object. The stored energy or data can be impregnated throughout the printed object in its material 71 or isolated within a designated area within the printed object such as the hollow area 72 shown by example in FIG. 4a. The material 71 used in the body of the printed design and any material below the design's surface 70 can be a combination of numerous materials and components blended together via printing technology to create a sophisticated highly customizable feature set. In addition to printing out designs with customized shapes, aesthetic appearance, size, flexibility and strength, 3D printed objects can have customized power and data incorporated into the design with varying materials and material properties providing versatile add on features. Custom 3D printed batteries, semiconductors, integrated circuits, data storage, data transmission systems, RFID, cameras, prosthetics, body parts, food, musical instruments and weapon components are just a few design features which may result from 3D printing an attaching member. This advanced customization of digitally printed objects enables a new wave of smart products where digital designs can customize feature sets well beyond appearance and shape.

The backside area 77 of the digitally printed 3D object in FIG. 4a is shown to have a separate design feature which represents attachment means 48 that can be integrated with the printed object. The attachment means requires at least one bottom layer 73 of the printable material and may be produced by a series of accumulated printed material that forms an attachment means which can be mechanical, matable, adhesive or any form of attachment means that can be produced via 3D printing. The attachment means can be a 3D printed mechanical fastening means such as hook and loop, snaps, and any other matable or mechanical fastening mechanism. By designing a 3D printed attachment means an attaching member can have very precise and customized attachment properties including holding strength and attachment methods that are optimized for the environment the object will be used including considerations for temperature, external force, wind conditions and other factors which may affect attachment. This level of customized attachment enables attachment in challenging environments and weather conditions, including outer space.

When using adhesive for attachment, adhesive may be applied after printing of the object or during the printing process itself. Since many additive manufacturing processes involve the 3D printing of objects layer by layer or in progressive fashion, the backside area 77 of the object may be coated with adhesive or adhesive attachment systems which can be built during the printing process. The adhesive attachment system can including an initial release liner layer, followed by at least one adhesive layer and then the structural body of the object 76 printed subsequently layer upon layer. Another option is to begin with an adhesive coated substrate as a base whereby the 3D printed design is printed upon the substrate to end up with a digitally printed 3D object printed upon an adhesively removably attachable printable media.

So the 3D printed design described in FIG. 4a provides a vast collection of features to the surface, internal structure and backside of an attaching member that delivers a vastly wider range of customization than 2D printing. With a 3D printed object the attaching member can have its attachment means printed so that the object is one monolithic structure with surface features, internal features and attachment means printed as one unit.

Figure 4B:
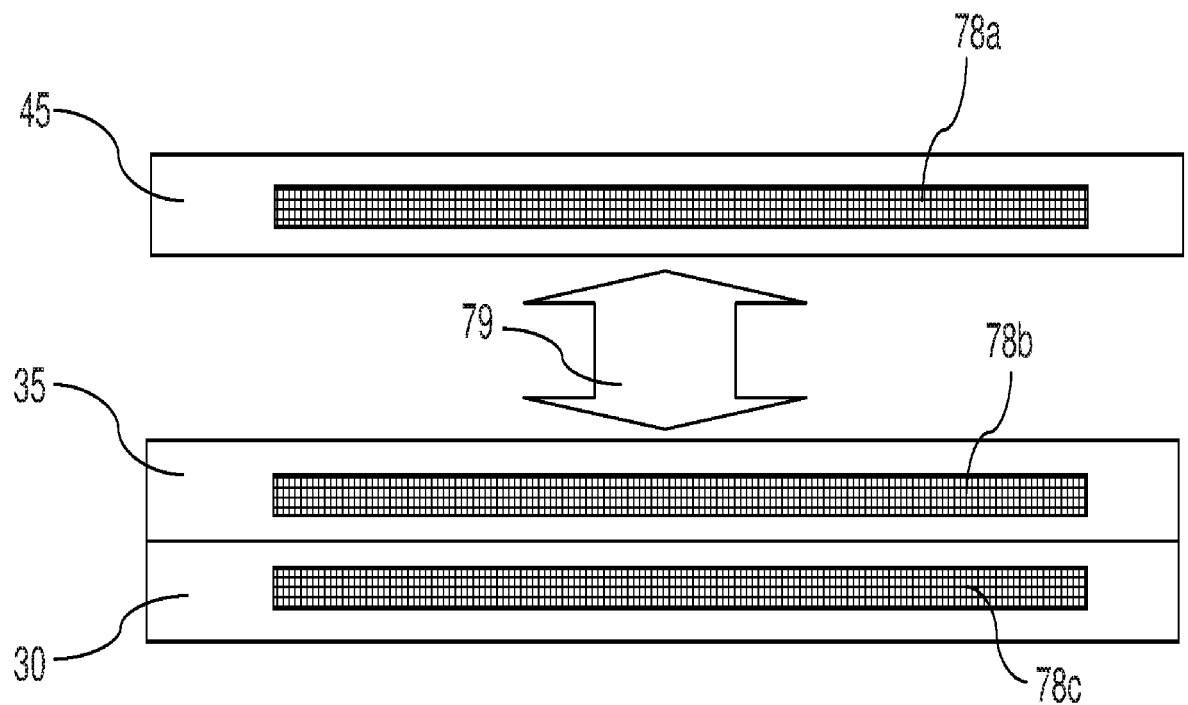
FIG. 4b is an illustration of advanced features enabled by 3D printing including stored and transferable energy and data.

FIG. 4b describes an advanced attachment area 35 in further detail whereby the attachment area allows more than merely enabling a means of removable attachment between a digitally printed object 45 and a material 30 or article of manufacture. The attachment area 35 can be considered to be a bridge between the digitally printed object 45 and the material 30 it is attached too. This bridge creates a connection where processes are enabled which require flow of energy, power, electricity, data, sound, liquid or other materials between a digitally printed object 45 and the material 30 it is attached to. Digital 3D printing now allows uniquely designed data and power storage architectures 78a to be printed, producing attaching members with bespoke collections of data and power capacities. These stored data and power features 78a can be printed within a form factor that optimizes performance efficiency, ergonomics and aesthetic appeal. The mating of the digitally printed object 45 to the material 30 creates a connection whereby energy, electricity, data or material can flow, as well as any other transferable material or feature. The flow of data and energy may be directed from the article 30 to the digitally printed object 45 or vice versa. Since the transferable material can be stored in the printed object 78a, attachment area 78b or material 78c the flow of stored energy, data or material can move in any direction desired based on the needs of the application where the invention is being used.

Those familiar in the art will recognize varying methods of energy transfer 79 including but not limited to conduction, convection, radiation, advection and the like. Likewise, those familiar in the art will recognize varying methods of data transfer 79 that can be employed to move data between the attaching member 45 and attachment area 35, including but not limited to wired and wireless means of data transmission. The transfer of physical matter 79, including water, biological material and other materials that flow, may be enabled by the connection of attachment means via flow, gravity and other natural and artificial forces. Those familiar in the art will recognize a variety of energy resources that can be transferred 79 between the attaching member and the attachment area including solar, thermal, optical, sound, electrical, radiant, chemical, nuclear, sound, elastic, gravitational, mechanical energy and the like. Either the attaching member 78a or the attachment area 78b and/or article of manufacture 78c can store potential energy in reserve for later use and conversion into kinetic energy.

The present invention introduces the concept of "smart products" that utilize the digitally printed attaching member to serve as a source of "smart data" and "smart energy". With at least one attachment area 35 on a product 30 combined with a 3D printed attachment member 45 products are enabled to have increased control of the placement and disbursement rate of energy, data and any transferable matter. These new smart products have advanced efficiency and form factors which offer a new evolution of customizable products.

FIG. 5 illustrates how the present invention can serve to modify the aesthetic appearance and functionality of an infant car seat 70 by changing the look and functionality of an infant car seat cover 72 using an allocated space 35 to removably attach a printed design 45 maintained on an object 40.

FIG. 6 illustrates how the present invention can serve to modify the aesthetic appearance and feature set of a recliner chair 80 and a recliner seat protector 82 using an allocated space 35 to removably attach a digital printed design 45 maintained on an object 40. FIG. 6 also shows a cat 87 on the cover 82 to demonstrate how seat covers face varying pressure applied to its surface depending on the weight of the body 87 resting on the cover 82. Alternatively, the present invention can be used to apply a protective barrier patch directly onto the surface of a recliner chair 80, as opposed to a seat cover 82 used for protection of the recliner 80.

Figure 7:
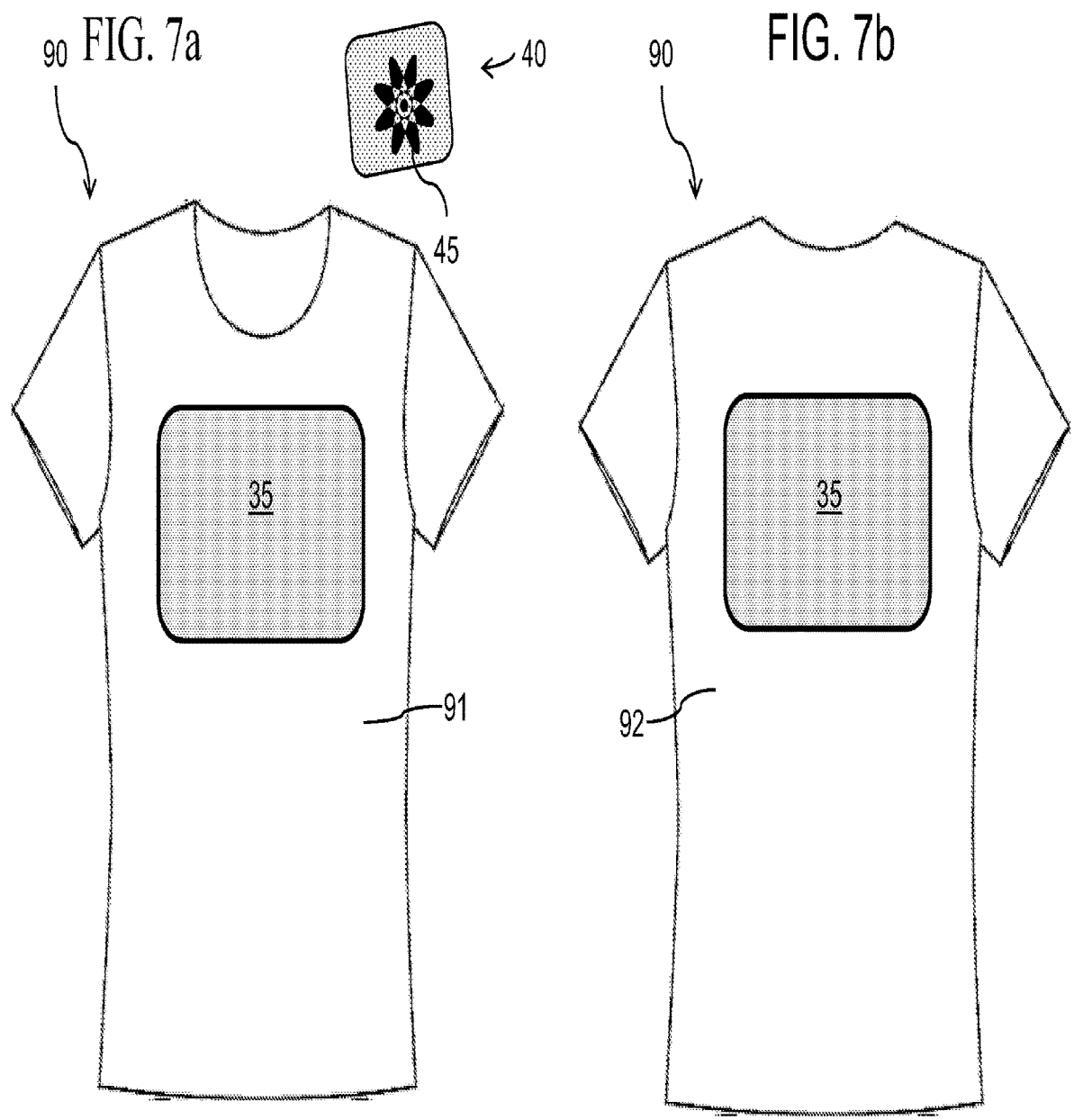
FIGS. 7a and 7b are a front view and rear view, respectively, of a T shirt with an attachment area for accepting a digitally printed design.

FIG. 7a illustrates how the present invention can serve to modify the aesthetic appearance and functionality of the front side 91 of a T shirt 90, or other textile apparel, that may be exposed to varying temperature ranges or changing pressure on the apparel's surface caused by body weight. As described in other textile products, the present invention uses an allocated space 35 to removably attach a printed design 45 maintained on an object 40. FIG. 7b shows the back side 92 of a T shirt 90 to point out that the rear side of a T shirt would likely benefit more from the present invention than the front side 91 since it will experience more variations in pressure from body weight.

FIG. 8 provides an example of how the present invention can serve to apply a removable identifying emblem 45 on a suitcase 100 using an allocated space 35 to removably attach an object 40 that maintains the emblem 45. Suitcases 100 and other forms of baggage can often be confused at airports and the present invention serves to provide a means of removably attaching an identifying ornamental design 45 without damaging the suitcase 100 and protecting it from adhesive migration from the weight and pressure that may be applied to it during use.

FIG. 9 provides an example of how the present invention can serve to apply a digitally printed design 45 on a fabric hat 110, such as a baseball cap, using an allocated space 35 to removably attach an object 40 that maintains the ornament 45. In FIGS. 5,6, 7a, 7b, 8 and 9 it is recognized that the current invention provides a means for the object 40 to be removably attached using adhesive without the threat of adhesive migration. The examples portrayed in the drawings serve to illustrate a small varied set of opportunities to use the present invention and is not intended to limit the range of varying textiles that can benefit from the invention.

Figure 10:
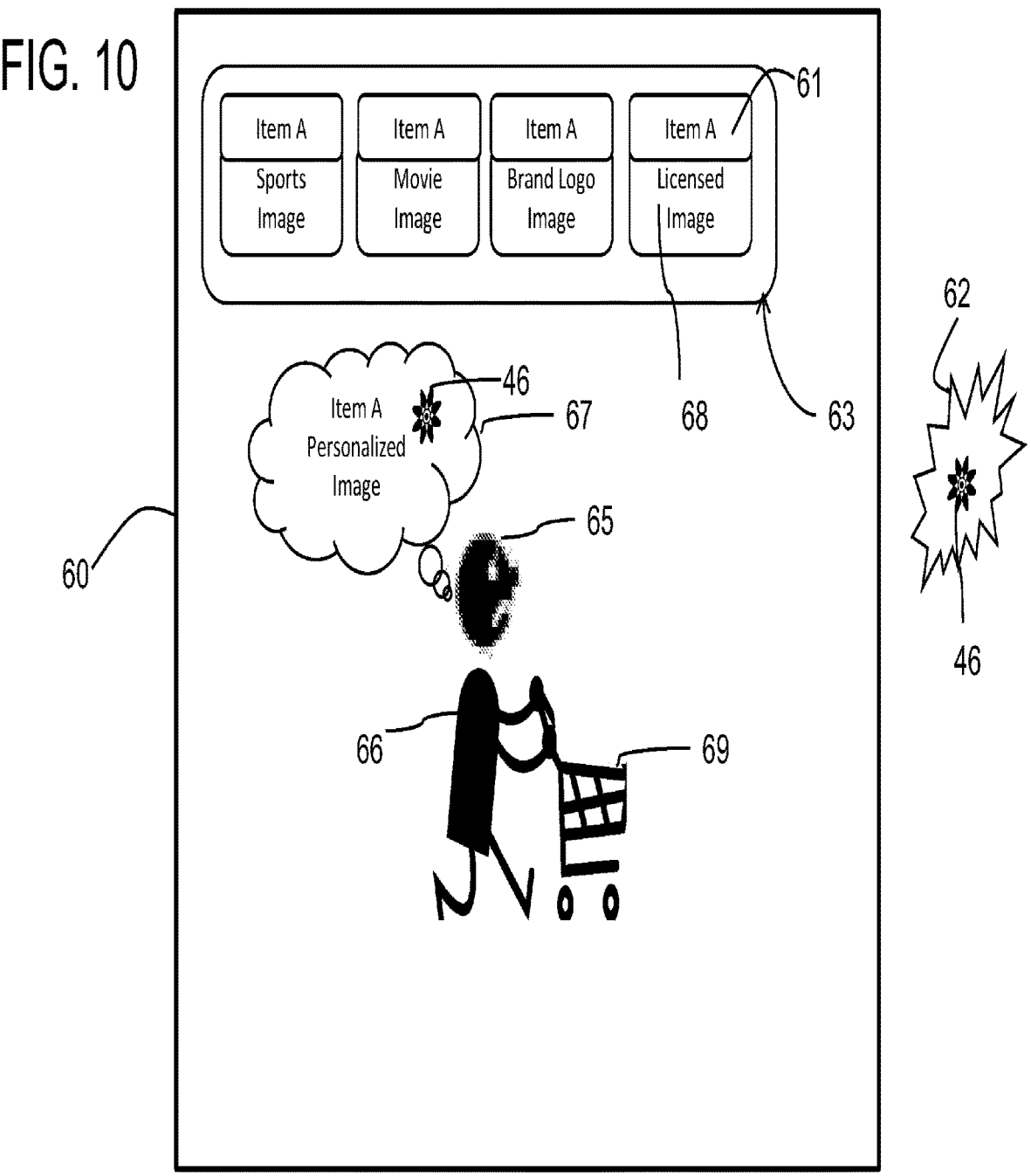
FIG. 10 is a diagram of the shortcomings of traditional brick and mortar business models which is overcome by the present invention.

Those familiar in the art will recognize that the present invention opens up numerous opportunities to add efficiency to some pre-existing business models. The present invention specifically defines a new process that adds efficiency to the traditional brick and mortar retail business model and introduces internet efficiencies into the model. FIG. 10 illustrates the typical challenge faced by traditional brick and mortar retail stores 60 who are able to offer a limited selection of items 61 due to the confinement of limited physical shelf space 63. In FIG. 10 a typical brick and mortar store shelf 63 is depicted with sufficient space to sell a maximum of four items 61, however those familiar in the art will recognize that the number of items 61 available on a brick and mortar store shelf 63 will vary and may be even more limiting than the four used in the current drawing. FIG. 10 further illustrates the frustration 65 often felt by shoppers 66 who are faced with limited choice at a traditional brick and mortar retail location 60. FIG. 10 further depicts some of the inherent shortcomings that exist in the traditional brick and mortar business model, including but not limited to a narrow breadth of features and designs in the product offering.

In FIG. 10, a shopper 66 is visiting a store shelf 63 to purchase an item, wherein he is hoping to find an item 61 with a particular design or feature set 46 on it that matches their aesthetic or feature preference 67. In the case depicted in FIG. 10, the shopper 66 prefers to purchase a particular item 61 with a personalized image or feature set 46 that they have in mind 67. Due to the restricted amount of shelf space 63 available, the shopper 66 sees limited options available with a varying image 68 displayed on each item 61. As is often the case, the shopper 66 must decide whether to purchase from the available items 61 on the shelf 63 or leave the retail store 60 with an empty shopping cart 69 and no purchase made. If the available items 61 are considered unappealing to the consumer 66, there is a growing tendency for a consumer 66 to postpone a retail purchase to pursue a search for a more aesthetically appealing product that may be available from an online retailer or supply source that has the benefit of a wider breadth of product available on the internet 62.

Brick and mortar retailers lose billions of dollars each year to the competitive breadth of products available on the internet 62 and this trend is accelerating. The restrictions present in the traditional brick and mortar business model cause the consumer to miss out on some of the inherent benefits available in a traditional brick and mortar business model. Economies of scale and low cost per unit distribution found at larger brick and mortar retailers often allow for considerable savings and price advantages over items purchased online. However, the current brick and mortar business model often leaves consumers 66 frustrated to the point of opting for more expensive products that meet their aesthetic preferences 46 and can be found online 62. FIG. 10 shows how both brick and mortar retailers 60 and consumers 66 lose out on a mutually beneficial business transaction due to limits in physical shelf space 63 found at brick and mortar retailers 60. The aforementioned challenge is also faced by individuals, manufacturers, businesses, healthcare providers, governments and any organization who finds themselves limited in their ability to find an article with the precise feature set they are seeking.

Figure 11:
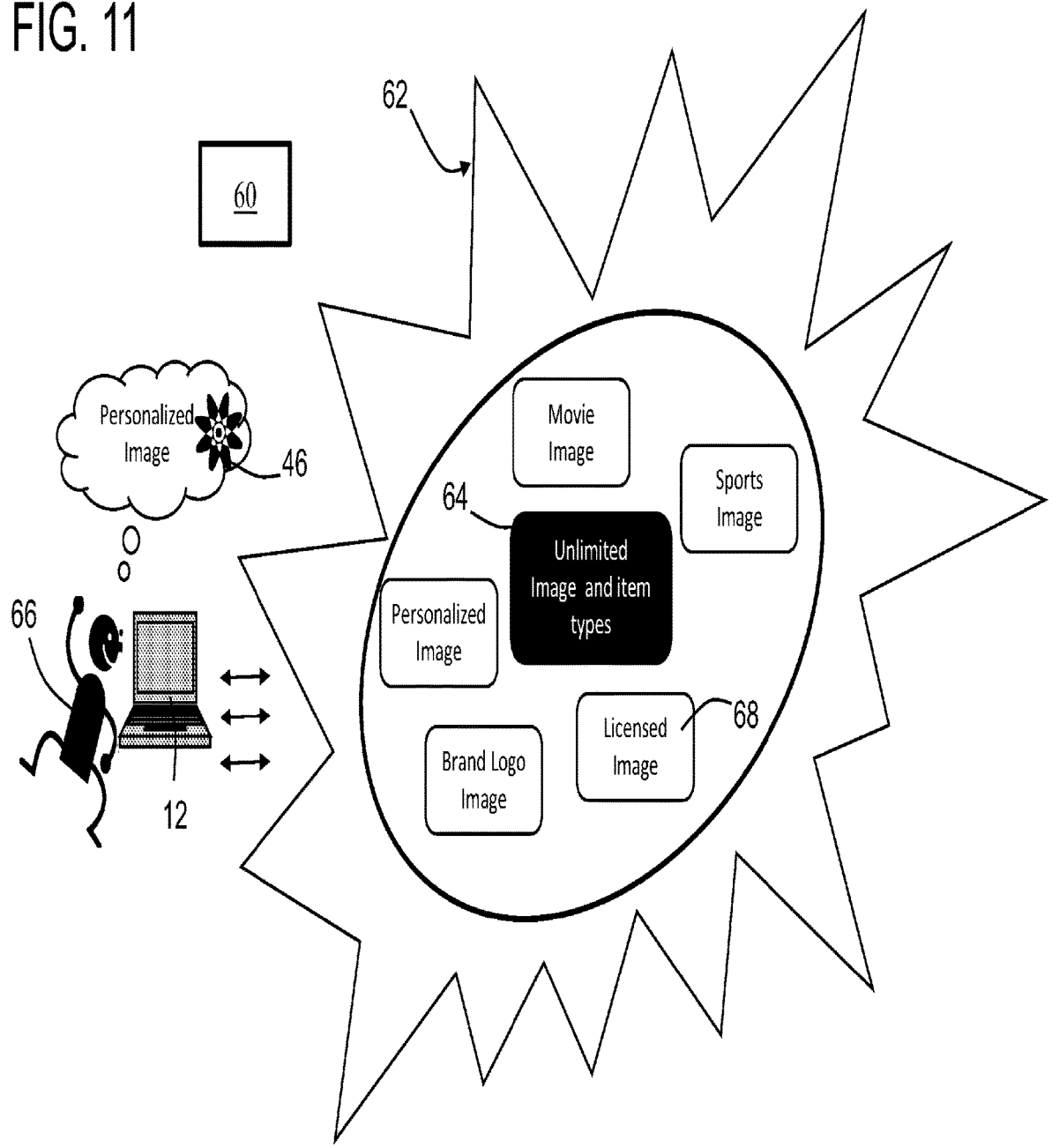
FIG. 11 is a diagram of the wide breadth of choice available to consumers using the internet to purchase products.

FIG. 11 briefly illustrates why the virtually unlimited available breadth 64 of products 68, with varying features and designs, found on the internet 62 is moving consumers 66 away from the brick and mortar retailer and product supplier or manufacturer 60. FIG. 11 shows that the evolving online retail environment offers a virtually unlimited selection of images and design features 64 that can be applied to products that have traditionally been limited in their aesthetic appearance and feature set options at the brick and mortar shelf and/or manufacturing warehouse. For the consumer 66, the benefit of selection often comes at an elevated cost due to distribution inefficiencies and reduced economies of scale that are often enjoyed by larger brick and mortar stores 60.

Figure 12:
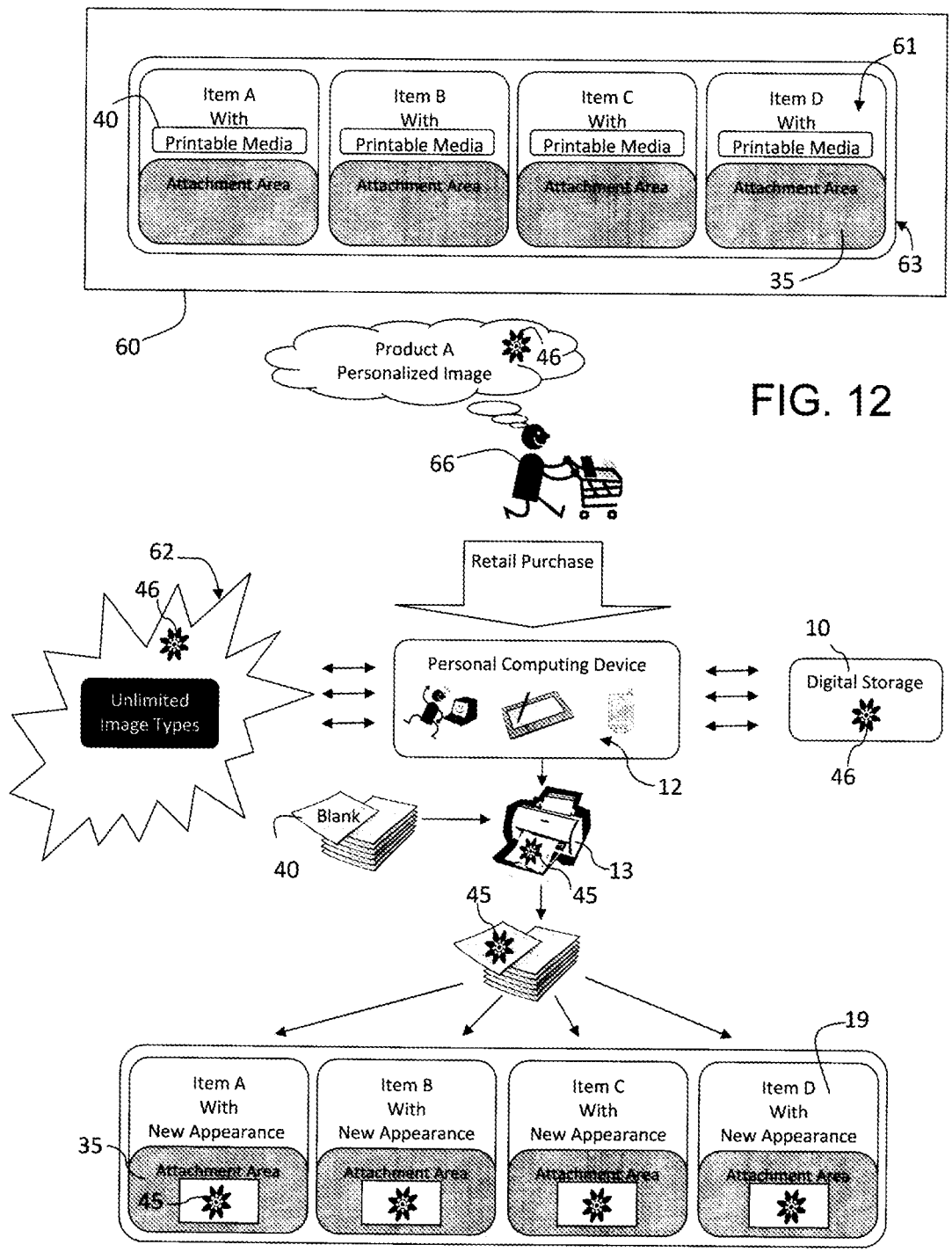
FIG. 12 is a flow diagram of a new business model introducing the internet and digital technology to a add value and efficiencies to brick and mortar retail business.

FIG. 12, illustrates a new business model provided by the present invention whereby a consumer or company seeking advanced customization 66 can enjoy substantially more choice in product features and aesthetic options from a brick and mortar retailer, distributor, supplier or manufacturer 60. The business model depicted in FIG. 12 is a hybrid of the traditional brick and mortar model depicted in FIG. 10 combined with the expanded breadth of choice made available in typical on line retail business models depicted in FIG. 11. The new model allows the consumer 66 and retailer or manufacturer 60 to be less constrained by the limited shelf or warehouse space 63 inherent in a brick and mortar business model. In particular, the business method depicted in FIG. 12 uses an attachment area 35 provided in the present invention to bring the breadth power of the internet 62 to the retail shelf or product manufacturing facility 63. The present invention segregates the feature of a digitally printed design 45, 2D or 3D, from a physical product 61, making the design 45 a virtual component 46 available from the internet 62, digital storage device 10 or any other means of maintaining digital content. The virtual image 46 can be applied onto an item 61 after purchase or acquisition from a brick and mortar store or supply source using the teachings of the present invention, allowing the virtual image 46 to become integrated with a physical product 19 after purchase or acquisition from a retail store or supply source. By separating a printed design 45 and making it a digital component 46, the new business model offered by the present invention substantially returns some of the competitive advantages that have been lost by brick and mortar stores, suppliers and manufacturers to online retailers and supply chains.

FIG. 12 shows how the new business model uses a printable media 40 as a means to convert a virtual image 46 into a physical component 45 that can be applied to an item 19 after purchase or acquisition. The printable media acts as the object 40 described in detail in prior drawings of the present invention, including FIGS. 1a, 3, 4, 4a and 4b with all of the characteristics and teachings provided by the invention. Printable media 40 is any material that can be processed through a printer and have a digital design applied to it. Printable media can be a substrate that is printed upon or material formed through printing. The printable media 40 shown in FIG. 12 can be included with the physical product 61 purchased at the store 60 but those familiar in the art will recognize that the digitally printed attaching member 45 can also be offered as a peripheral item or accessory and does not necessarily need to be purchased at the same time or place as the item 61 and does not necessarily need to be sold with the item 61. The printable media 40 merely needs to be made available to be used at some time after purchase or acquisition of the item by either the end user or an outsourced printing service. Although the new business model offers significant benefits to brick and mortar retailers, those familiar in the art will recognize cost saving benefits available to online retailers who may want to minimize inventory requirements and improve cashflow using the model offered by the present invention.

The new process depicted in FIG. 12 describes a new way of purchasing or acquiring items from a brick and mortar store or supply source 60 which begins with abandoning some of the aesthetic and feature constraints that have previously existed in the traditional brick and mortar model described in FIG. 10. Since a digital printed design 45 can be added after purchase, brick and mortar retailers and suppliers 60 can use shelf space 63 to offer a more varied physical feature set or product assortment on the shelf 63. Valuable retail space 63 that was spent offering aesthetic or functional variety can be used to offer an even wider breadth of functional variety or wider product assortment since satisfaction derived from customization can be obtained after purchase with the new model. FIG. 12 shows that the new model offered by the present invention allows the same shelf space 63 used in FIG. 10 to offer Item A can now be used to offer Items A, B, C, and D without concern for limiting the aesthetic or functional appeal of the items 61 offered. The new model offered by the present invention serves to remove or minimize the purchase barrier that may exist due to limited design choice available with traditional brick and mortar business models.

The new process allows a consumer 66 to purchase or acquire an item 61 from a brick and mortar retailer or supply source 60 and use a personal computing device 12, such as a computer, tablet, pda, laptop, netbook, smartphone or any other digital computing device, to download a virtual ornamental design 46 of their choosing in a digital format. The design 46 can be any form of digital design that would add value, aesthetic or functional, to a product 61 and can include licensed designs. Alternatively, the design 46 can be any form of digital design that produces structural or functional features available using 3D printing technologies as discussed in the present invention. The virtual image 46 can be a pre made design found on the internet 62 or it can be a design 46 that is created or modified by the consumer 66 on a personal computing device 12 or with the help of software or a website application. The preferred embodiment uses any digital file that can be stored and/or sent to a digital printer. Some variations of the business model will use digital files that cannot be altered, while other variations may use digital files that allow altering and customizing the designs to create bespoke versions of a design to be digitally printed.

With a preferred design 46 downloaded to a personal computing device 12, the consumer 66 can take the next step towards converting the virtual image 46 to a physical attachable component 45 that can be applied onto the purchased or acquired item 19. The next step in the process is to print out the virtual image 46 from a personal computing device 12 onto a blank piece of printable media 40. The printable media illustrated in FIG. 12 is an exemplary depiction of printable media which was described in detail in FIG. 1A and is not intended to limit the form or type of printable media 40 that can be used in digital printing 3D designs. The preferred embodiment uses a printable media 40 that is able to manage the environment where the purchased product 19 may be used. Factors such as temperature, ultraviolet exposure, lateral friction and other extraneous factors are all considered when using the correct printable media 40 for the product 61 being sold. Those familiar in the art will recognize numerous advancements in print media that allow printed designs 45 to be attached to a wide range of surfaces 35 under varying ranges of environmental conditions and varied product shapes. The method considers using printable media that is a substrate with attachment means, adhesive or mechanical, residing on its backside and a digital design printed on its top surface. Alternatively, digitally printed 3D attaching members may have printable media formed with attachment means on its backside creating a monolithic structure integrating a digitally printed design and attachment means in one digitally printed output.

The preferred embodiment uses a digital printer 13 widely available to most households, although those familiar in the art will recognize applications where the model can be applied to larger format printers or more expensive specialized printers that are available at print shops or other specialized manufacturing facilities including additive manufacturing facilities. The printer 13 illustrated in FIG. 12 represents the vast assortment of printer types within the digital printing space and is not limited to the form factor or type shown in the illustration. The digital printer 13 represents any printer that converts a digital file into a printed output. 2D and 3D printers have become common for personal in-home use, office use and professional use. Furthermore, 2D and 3D printed output can be obtained from print shops that use varying types of digital printers and varied printing materials and production capabilities. When an expensive printer is required the business model makes available digital print outs that can be produced outside of the home and delivered to any convenient distribution location or directly to a person's home or office. This allows complex attaching members 45 to be created with sophisticated printing technology at a reasonable cost without the need to own a more expensive printer or production machine. Outsourcing the printing of the attaching member 45 also addresses any specialized knowledge that may be necessary to use software or advanced printers. This becomes more necessary when customization is done to provide advanced functionality or where extreme precision is necessary for the feature delivered by the attaching member 45.

The present invention allows printable media 40 to utilize adhesive as the attachment means, however those familiar in the art will recognize that the new model can be applied to products that use alternative means of attachment and fastening systems, including hook and loop, snaps, buttons and the like. The new model can be used for items 61 made of porous material, such as textiles or other soft goods products, that would not be able to have a printable media 40 using adhesive due to the threat of adhesive migration that is resolved by the present invention. At the same time, those familiar with the art will recognize that the new model provided by the present invention can also offer benefits for non-porous hard good items that would find advantages to using an attachment area 35 to help promote removable attachment of a customized digitally printed object 45.

The new model offered by the present invention uses a printable media 40 that makes the printable media 40 removable. This adds further value to the new model by allowing a consumer to not only select their initial design 45 but to also be able to remove it or change it when desired. The present invention uses the attachment area 35 to provide the versatility of being able to change the appearance or functionality of an item 61 purchased or acquired from a brick and mortar store or alternative supply source 60 at any time during its useful life. The preferred embodiment of the printable media 40 uses the right balance of adhesion strength to allow for an efficient means of affixing and removing a digitally printed design 45, 2D or 3D, when desired.

Thus there has been shown and described a novel means of removably attaching a digitally printed object using adhesive onto a porous surface subject to a wide range of temperature and pressure without the threat of adhesive migration which fulfills all the objects and advantages sought therefore. There is further introduction of a new business model that uses the present invention to transform a brick and mortar purchased or acquired item by adding a digitally printed design after purchase. Many changes, modifications, variations and other uses and applications of the subject will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

It is claimed:

1. A method of providing an attaching member, the attaching member being removably attachable to an article having an attachment area, the method comprising:
    allowing a consumer to choose the attaching member, or provide or select one or more design parameters for the attaching member;
    transmitting a digital file that reproduces the attaching member from the digital file after the consumer chooses the attaching member or provides or selects the one or more design parameters for the attaching member;
    reproducing the attaching member from the digital file responsive to the transmitting, wherein the attaching member is produced by a device configured to convert the digital file into the attaching member, wherein the attaching member is three dimensional and is removably attachable to the article after being reproduced from the digital file; and
    providing to the consumer the article or the attaching member.

2. The method according to claim 1, wherein the attaching member is produced using a 3D printer.

3. The method according to claim 2, wherein the consumer chooses the attaching member and/or at least some of its design specifications and/or material composition and/or functional features.

4. The method according to claim 2, wherein the consumer provides at least some or all design parameters for the attaching member including design specifications and/or material composition and/or functional features.

5. The method according to claim 2, wherein the attachment area is configured to enable bidirectional transfer of energy and/or data between the article of manufacture and the 3D-printed attaching member.

6. The method according to claim 2, wherein the attaching member is capable of storing and/or receiving and/or sending energy and/or data.

7. The method according to claim 1, wherein the attaching member has customizable features enabled by digital printing and/or 3D printing.

8. The method according to claim 7, wherein the attachment strength of the removably attachable attaching member is a customizable feature.

9. A product prepared according to the method of claim 1, the product comprising the article and the attaching member.

10. A method of providing an article with an attaching member, the method comprising:
    instructing a consumer to choose or provide an attaching member or one or more design features of the attaching member to be digitally printed and subsequently attached to an allocated space on the article;
    transmitting or receiving a digital file that reproduces the attaching member or one or more design features of the attaching member from the digital file after the consumer chooses or provides the attaching member or the one or more design features of the attaching member;
    instructing the consumer to have the attaching member digitally printed by a printer that converts the digital file into the attaching member, wherein the attaching member is three dimensional and is printed using printable media that is removably attachable to the article after being printed; and
    providing to the consumer the article or the attaching member.

11. The method according to claim 10, wherein the attaching member is capable of storing or receiving or sending energy or data.

12. The method according to claim 10, wherein the attachment area is configured to enable bidirectional transfer of energy and/or data between the article of manufacture and the attaching member.

13. The method according to claim 10, wherein the attachment strength of the attachment means is customizable.

14. The method according to claim 13, wherein the attachment means is magnetic.

15. The method according to claim 10, wherein the attaching member has customizable features enabled by 3D printing.

16. The method according to claim 10, wherein the attaching member is capable of being reprinted and/or partially reprinted upon to rejuvenate and/or add and/or modify functionality of the attaching member.

17. The method according to claim 10, wherein the attaching member is interchangeable with another attaching member.

18. The method according to claim 10, wherein the digital design defines one or more functional features of the attaching member.

19. The method according to claim 10, wherein the attachment area and/or the attaching member is configured to receive and/or send and/or store data, optionally smart data.

20. The method according to claim 19 serving as a source of a bespoke collection of data.

21. The method according to claim 10, wherein the attachment area and/or the attaching member is configured to receive and/or send and/or store energy, optionally smart energy.

22. The method according to claim 21, wherein the attaching member serves as a source of bespoke power capacities.

23. A method of customizing an article, the method comprising:
    allowing a consumer to choose or provide an attaching member or one or more design features of the attaching member to be digitally printed and subsequently attached to an allocated space on the article;
    transmitting or receiving a digital file that reproduces the chosen or provided attaching member or the one or more chosen or provided design features of the attaching member; and
    digitally printing the attaching member from the digital file responsive to the transmitting, wherein the attaching member is digitally printed by a printer that converts the digital file into the attaching member;
    wherein the attaching member is a physical component having its form defined by the digital file;
    wherein the attaching member is removably attachable to the article; and
    providing to the consumer the article or the attaching member.

24. A method of customizing an article, the method comprising:
    allowing a consumer to choose an attaching member, or provide or select one or more design parameters for the attaching member, wherein the attaching member is removably attachable to the article;
    transmitting or receiving a digital file that reproduces the attaching member from the digital file; and
    reproducing and providing to the consumer, or allowing the consumer to reproduce, the attaching member from the transmitted or received digital file;
    wherein the attaching member is produced by a device configured to convert the digital file into the attaching member; and
    wherein the attaching member is a physical component having its form defined by the digital file.

* * * * *